(12) United States Patent
Cheung et al.

(10) Patent No.: US 7,869,158 B1
(45) Date of Patent: Jan. 11, 2011

(54) HELICOID GROUP SWITCHING

(75) Inventors: Man Cheung, Campbell, CA (US);
Perry Neos, Los Altos, CA (US); David Rutherford, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 55 days.

(21) Appl. No.: 12/192,931

(22) Filed: Aug. 15, 2008

Related U.S. Application Data

(60) Provisional application No. 60/956,228, filed on Aug. 16, 2007.

(51) Int. Cl.
*G11B 5/596* (2006.01)
*G11B 21/02* (2006.01)
*G11B 15/12* (2006.01)
*G11B 5/09* (2006.01)

(52) U.S. Cl. .................. 360/77.07; 360/75; 360/51; 360/61

(58) Field of Classification Search ............... None
See application file for complete search history.

(56) References Cited

U.S. PATENT DOCUMENTS

| | | | |
|---|---|---|---|
| 6,775,091 B1 | 8/2004 | Sutardja | |
| 6,987,636 B1 | 1/2006 | Chue et al. | |
| 6,992,852 B1 | 1/2006 | Ying et al. | |
| 7,002,761 B1 | 2/2006 | Sutardja et al. | |
| 7,019,937 B1 | 3/2006 | Liikanen et al. | |
| 7,068,459 B1 | 6/2006 | Cloke et al. | |
| 7,088,533 B1 | 8/2006 | Shepherd et al. | |
| 7,113,362 B1 | 9/2006 | Lee et al. | |
| 7,167,333 B1 | 1/2007 | Liikanen et al. | |
| 7,209,312 B1 | 4/2007 | Sutardja | |
| 7,248,427 B1 | 7/2007 | Everett et al. | |
| 7,307,807 B1 | 12/2007 | Han et al. | |
| 2007/0195445 A1* | 8/2007 | Vanlaanen et al. | 360/51 |
| 2007/0211369 A1 | 9/2007 | Yang et al. | |
| 2008/0013202 A1 | 1/2008 | Shepherd et al. | |
| 2008/0013203 A1 | 1/2008 | McMurtrey | |
| 2008/0030889 A1* | 2/2008 | Smith et al. | 360/77.08 |

OTHER PUBLICATIONS

U.S. Appl. No. 12/188,118, filed Aug. 7, 2008, as retrieved from PAIR on Sep. 24, 2009.
U.S. Appl. No. 12/192,971, filed Aug. 15, 2008, as retrieved from PAIR on Sep. 24, 2009.

* cited by examiner

*Primary Examiner*—Andrew L Sniezek

(57) ABSTRACT

A recording medium can include multiple helicoid patterns arranged in multiple helicoid groups, e.g., first and second helicoid groups. Operating a disk drive can include switching between helicoid groups to maintain the alignment of the head with respect to a target track of the rotating recording medium. Enabling a switch can include receiving a waveform produced by a head operated with respect to a rotating recording medium, generating first information from one or more portions of the waveform corresponding to the helicoid patterns of the first helicoid group; generating second information from one or more portions of the waveform corresponding to the helicoid patterns of the second helicoid group; and analyzing the second information with respect to the first information to generate calibration information. The calibration information can compensate for operational differences between using the helicoid patterns of the first helicoid group and the helicoid patterns of the second helicoid group.

28 Claims, 18 Drawing Sheets

HELICOID GROUP SWITCHING

CROSS-REFERENCE TO RELATED APPLICATIONS

This patent application claims priority to U.S. Provisional Application Ser. No. 60/956,228, titled "An apparatus to Perform Spiral Sets Switching in Harmonic Spiral Tracks," filed on Aug. 16, 2007, the entire contents of which are incorporated herein by reference.

BACKGROUND

The present disclosure describes systems and techniques relating to operating a disk drive.

Storage devices such as a magnetic medium based disk drive can store data on circular, concentric tracks on a disk surface. A read-write head retrieves and records data on a magnetic layer of a rotating disk as the head flies on a cushion of air over the disk surface. When retrieving data, magnetic field variations are converted into an analog electrical signal, the analog signal can be amplified, converted to a digital signal, and interpreted. To guarantee the quality of the information saved on and read back from the disk, the read-write head should be accurately positioned at the center of the track during both writing and reading. A closed-loop control system can respond to servo information embedded in dedicated portions of a track on the recording surface to accurately position the head and synchronize drive timing.

The servo information defines the position of the data tracks and thus should be written with great accuracy in order for a closed-loop control system to operate properly. Typically, servo information is written on a disk surface as a radially extending set of spokes or wedges, e.g., servo wedge. In some implementations, a portion of a servo wedge at a particular track location can include a synchronization field, index mark, a gray coded track number, and two or more fine-positioned offset bursts configured in an echelon across the track. Head positioning relative to a track center can be determined and corrected, if necessary, by reading and noting the respective amplitudes and timings of the offset bursts.

Traditionally, a machine called a servo writer is used to write the embedded servo information on the disk surface. Commonly, a servo writer uses a large, massive granite base to minimize the effects of vibration. The servo writer can also use precision fixtures to hold the target drive, a precision, laser-interferometer-based actuator arm positioning mechanism to place the arms radially with respect to the axis of rotation of the disks in the drive, and an external clock head to position the servo wedges in time. Present servo writers are typically large and expensive, and as the typical track density increases, the servo writing time also increases, which can create a bottleneck in the disk drive manufacturing process at the servo writer station.

To reduce the time required by the servo writer, techniques such as self-servo writing (SSW) have been developed. Instead of slowly writing the servo information to each concentric data track on each surface of each disk in a hard drive, a servo writer, to enable SSW, can write several helicoid patterns such as spirals or portions thereof to the disk surface. Then, without the aid of the servo writer, a disk drive can use information derived from the helicoid patterns to determine the radial and circumferential position of the head in order to write conventional servo information to the disk surface.

SUMMARY

The present disclosure describes systems and techniques that, among other things, are used in the operation of a disk drive employing multiple helicoid patterns.

According to an aspect of the described systems and techniques, methods for operating a disk drive can include receiving a waveform produced by a head operated with respect to a rotating magnetic recording medium, the magnetic recording medium including multiple helicoid patterns arranged in a first helicoid group and a second helicoid group; generating first information from one or more portions of the waveform corresponding to the helicoid patterns of the first helicoid group; providing output based on the first information to align the head with respect to a target track of the rotating magnetic recording medium; generating second information from one or more portions of the waveform corresponding to the helicoid patterns of the second helicoid group; analyzing the second information with respect to the first information to generate calibration information; and providing output based on the second information and the calibration information to maintain the alignment of the head with respect to the target track while data is being written to the target track. The calibration information can compensate for operational differences between using the helicoid patterns of the first helicoid group and the helicoid patterns of the second helicoid group to align the head with respect to the target track. Other implementations can include corresponding systems, apparatus, and computer program products.

These, and other aspects, can include one or more of the following features. The calibration information can compensate for operational differences being of timing and radial position. The techniques can include using the output based on the first information to operate a disk drive including the head and the magnetic recording medium and switching to using the output based on the second information and the calibration information to operate the disk drive.

Analyzing the second information with respect to the first information can include determining a radial position deviation of the head with respect to the target track by at least using the first information; using the radial position deviation to determine a radial repetitive run-out estimate for the second helicoid group; detecting multiple phase differences based on the helicoid patterns of the second helicoid group while compensating for phase differences based on the helicoid patterns of the first helicoid group, each detected phase difference being responsive to a difference between a timestamp derived from at least a portion of the waveform that corresponds to a helicoid pattern of the second helicoid group and an expected timestamp; calculating a static phase difference component for each of the detected phase differences; calculating a representative static phase difference for the second helicoid group using the static phase difference components; and calculating a static phase correction value responsive to the representative static phase difference. Providing output based on the second information and the calibration information can include applying the radial repetitive run-out estimate to at least reduce an operational difference corresponding to alternating radial position; and applying the static phase correction value to at least reduce an operational difference corresponding to static timing.

Analyzing the second information with respect to the first information can include determining a radial position deviation of the head with respect to the target track by at least using the second information; and using the radial position deviation to determine a radial repetitive run-out estimate for the second helicoid group. Providing output based on the second information and the calibration information can include applying the radial repetitive run-out estimate to at least reduce an operational difference corresponding to alternating radial position. Further, analyzing the second information with respect to the first information can include adjusting a demodulation window to demodulate the helicoid patterns of the second helicoid group and to produce an adjustment value; and using the adjustment value to define the radial position deviation.

Analyzing the second information with respect to the first information can include determining an expected peak time value of the helicoid patterns of the first helicoid group; measuring multiple peak times of the helicoid patterns of the second helicoid group; calculating a representative peak time value based on the multiple measured peak times; and calculating a peak time correction value responsive to a difference between the expected peak time value and the representative peak time value. Providing output based on the second information and the calibration information can include applying the peak time correction value to at least reduce an operational difference corresponding to radial position.

Analyzing the second information with respect to the first information can include detecting multiple phase differences that are based on the helicoid patterns of the second helicoid group while compensating for phase differences based on the helicoid patterns of the first helicoid group, each detected phase difference being responsive to a difference between a timestamp derived from a portion of the waveform that corresponds to a helicoid pattern of the second helicoid group and an expected timestamp. The analyzing can further include calculating an alternating phase difference component for each of the detected phase differences; and initializing a phase repetitive run-out compensation using the alternating phase difference components. Providing output based on the second information and the calibration information can include applying the alternating phase difference components and using an output of the phase repetitive run-out compensation to at least reduce an operational difference corresponding to timing. The techniques can include storing the alternating phase difference components as initial values in a feed-forward table. The initial values can be updated by the phase repetitive run-out compensation.

Analyzing the second information with respect to the first information can include calculating a static phase difference component for each of the detected phase differences; calculating a representative static phase difference for the second helicoid group using the static phase difference components; and calculating a static phase correction value responsive to the representative static phase difference. Providing output based on the second information and the calibration information can include applying the static phase correction value to at least reduce an operational difference corresponding to static timing.

Analyzing the second information with respect to the first information can include calculating a static phase difference component for each of the detected phase differences; calculating a representative static phase difference for the second helicoid group using the static phase difference components; and calculating a static phase correction value responsive to the representative static phase difference. Providing output based on the second information and the calibration information can include applying the static phase correction value to at least reduce an operational difference corresponding to static timing.

The helicoid patterns of the first and second helicoid groups can define multiple synchronization frames. The techniques can also include detecting a number of synchronization frames in the waveform that correspond to the helicoid patterns of the second helicoid group using a demodulation window while providing output based on the first information; and adaptively centering the demodulation window to demodulate the helicoid patterns of the second helicoid group by at least using the detected number of synchronization frames. Generating second information can include using the adaptively centered demodulation window to generate at least a portion of the second information.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiment(s) below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a cellular telephone, a personal digital assistant (PDA), a mobile computer, a digital camera), a general purpose data processing apparatus (e.g., a minicomputer, a server, a mainframe, a supercomputer), or combinations of these.

A disk drive system can include a magnetic recording medium; a head to read data on the magnetic recording medium; a servo controller to operate the magnetic recording medium and the head, and processor electronics operatively coupled with the servo controller. The servo controller can rotate the magnetic recording medium. The magnetic recording medium can include multiple helicoid patterns arranged in a first helicoid group and a second helicoid group.

The processor can be configured to perform operations that include receiving a waveform from the head; generating first information from one or more portions of the waveform corresponding to the helicoid patterns of the first helicoid group; operating the servo controller on the first information to align the head with respect to a target track of the rotating magnetic recording medium; generating second information from one or more portions of the waveform corresponding to the helicoid patterns of the second helicoid group; analyzing the second information with respect to the first information to generate calibration information; and switching to operating the servo controller on the second information by using the calibration information to maintain the alignment of the head with respect to the target track. The calibration information can compensate for operational differences between using the helicoid patterns of the first helicoid group and the helicoid patterns of the second helicoid group to align the head with respect to the target track. The operations can include writing data to the magnetic recording medium while operating the servo controller on either the first or second information.

The subject matter described in this specification can be implemented to realize one or more of the following potential advantages. Helicoid group switching time can be reduced. Head positioning and timing can be maintained during and after switching helicoid groups. The described calibration techniques can be used to effect a seamless switch from one helicoid group to a different helicoid group with respect to circumferential and/or radial positions. The described subject matter can reduce or eliminate operational differences between using different helicoid groups. The operational differences can include timing, position, and static and dynamic variations thereof. The described subject matter can be used to increase the efficiency and performance of SSW processes.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
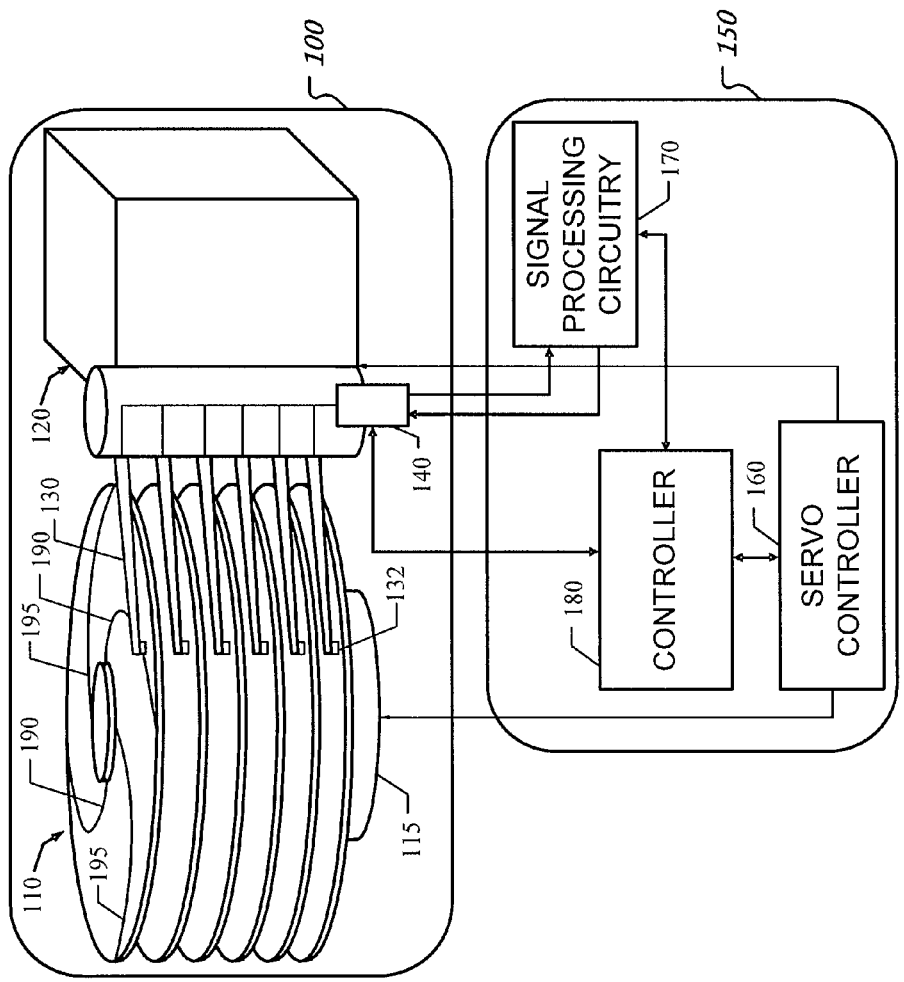
FIG. 1 shows an example of a disk drive that employs multiple helicoid groups.

A disk drive can maintain head positioning and timing using multiple helicoid patterns for track following purposes. Helicoid patterns may become unusable for such purposes. For example, a helicoid pattern may become unusable if a helicoid pattern is located on or within the vicinity of a desired write position on a target track. Also, a helicoid pattern may be unusable if one or more helicoid patterns contain defects. However, increasing a number of helicoid patterns on a disk and arranging the helicoid patterns into two or more helicoid groups can mitigate unusable helicoid patterns.

Disk drive control systems, such as a closed-loop feedback control system, can use data produced by a head's passage over a disk's helicoid patterns. An output of a control system can drive an actuator that is mechanically coupled with the head. In multiple helicoid group implementations, the control system can operate on data from one of the helicoid groups at a specified time. If a helicoid pattern becomes unusable for track following purposes, the control system can switch to using data from a different helicoid group.

Without compensation, differences in data from different helicoid groups can result in operational differences, e.g., a jump in head position or timing, when switching an input of a control system from one helicoid group to a different helicoid group. Calibration information, such as information derived from adaptive window centering, dynamic radial repetitive run-out measurements, static peak time measurements, dynamic phase measurements, and static phase measurements, can reduce or eliminate operational differences during a helicoid group switch. A control system can use the calibration information to smooth control transfer between different helicoid groups, e.g., reduce or minimize variations in head positioning and/or timing.

Calibration information can increase the accuracy and performance of disk drive operations such as a servo-self-writing (SSW) process. For example, if a helicoid pattern is unusable to write a servo wedge in a SSW process, a control system can switch to using helicoid patterns of a different helicoid group in writing that servo wedge. Consider, for example, a SSW process that will write M servo wedges to a track on a disk; the disk has N*M helicoid patterns written thereon with the helicoid patterns being arranged into N helicoid groups, where N is greater than one. Disk drive operations can use the calibration information to smoothly switch between the N helicoid groups to accurately write the M servo wedges to the track.

The subject matter described herein can be implemented in a storage system such as a disk drive. For example, the subject matter can be implemented as one or more computer program products that are stored in processor electronics. In another example, the subject matter can be implemented in dedicated logic circuitry. In some implementations, a storage device employing the subject matter herein can include a machine-readable medium, e.g., a magnetic-media disk, and a transducer, e.g., a medium read element and a medium write element—which can be integrated into a single read-write head.

FIG. 1 shows an example of a disk drive that employs multiple helicoid groups. The disk drive includes a head-disk assembly (HDA) 100 and drive electronics 150 (e.g., a printed circuit board assembly (PCBA) with semiconductor devices). The disk drive can include a magnetic recording medium such as disk(s) 110. The HDA 100 includes one or more disks 110 mounted on an integrated spindle and motor assembly 115. The spindle and motor assembly 115 rotates the disk(s) 110 under read-write head(s) 132 connected with a head assembly 120 in the HDA 100. The disk(s) 110 can be coated with a magnetically hard material (e.g., a particulate surface or a thin-film surface) and can be written to, or read from, a single side or both sides of each disk.

A disk 110 can have multiple helicoid patterns arranged in a first helicoid group 190 and a second helicoid group 195. Disk 110 can have additional helicoid patterns and helicoid groups than those shown in FIG. 1. The helicoid patterns can be written to disk 110 in a disk drive assembly process.

A head 132 on an arm 130 can be positioned as needed to read or write data on the disk. A motor, such as a voice coil motor (VCM), can be used to position the head over a target track. The arm 130 can be a pivoting or sliding arm and can be spring-loaded to maintain a proper flying height for the head 132 in any drive orientation. The HDA 100 can include a preamp/writer 140, where head selection and sense current value(s) can be set. The preamp/writer 140 can amplify a read signal before outputting it to signal processing circuitry 170. Signals between the HDA 100 and drive electronics 150 can be carried through a flexible printed cable.

Drive electronics 150 can include a servo controller 160, signal processing circuitry 170, and processor electronics such as a controller 180 or a processor to operate the disk drive. The signal processing circuitry 170 can include a read signal circuit, a servo signal processing circuit, and a write signal circuit. Controller 180 can be communicatively coupled with an external processor or data bus to receive read/write instructions, receive data to write to disk(s) 110, and transmit data read from disk(s) 110. Controller 180 can include a storage area for computer program code. Controller 180 can direct a servo controller 160 to control mechanical operations, such as head positioning through the head assembly 120 and rotational speed control through the motor assembly 115. In some implementations, the controller 180 can be integrated with the servo controller 160 and/or signal processing circuitry 170 and can be implemented as one or more integrated circuits (ICs). Drive electronics 150 can also include one or more interfaces, such as a host-bus interface, and memory devices, such as a read only memory (ROM) for use by a microprocessor, and a random access memory (RAM) for use by a hard disk controller.

In some implementations, the disk drive can include a self-servo-write controller that causes servo information to be written on disk(s) 110. The self-servo-write controller can be implemented, for example, as computer program code in the storage area of controller 180 or additional circuitry in drive electronics 150.

Controller 180 can be configured to perform one or more techniques described herein. Controller 180 can operate a servo controller 160 on one or more helicoid groups to position head 132 and to synchronize drive timing. Controller 180 can operate a control system such as a closed-loop control system. Controller 180 can switch between helicoid groups during disk drive operations. A controller 180 can perform one or more calibration techniques described herein to reduce or eliminate operational differences between using different helicoid groups. The output of such techniques can maintain head alignment and timing during helicoid group switching.

Figure 2A:
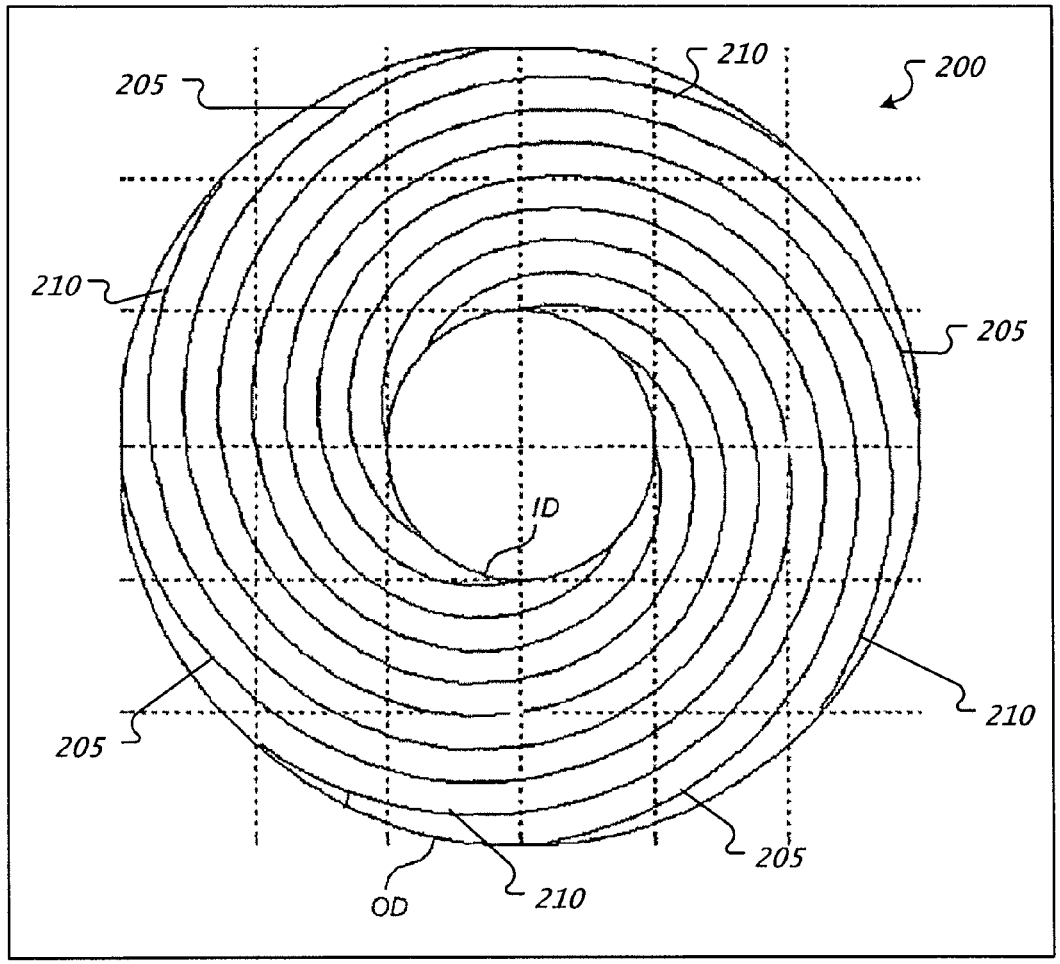
FIGS. 2A, 2B show different examples of helicoid patterns

FIG. 2A shows an example of helicoid patterns written on a recordable medium. Recordable medium 200 includes helicoid groups 205, 210. Implementations of medium 200 can have a different number of helicoid patterns and helicoid groups than those depicted. Helicoid patterns, such as spirals or portions thereof, can extend from the inner diameter (ID) to the outer diameter (OD) of medium 200. In some implementations, helicoid patterns of one group 205 can alternate with helicoid patterns of one or more different helicoid groups, such as group 210.

Figure 2B:
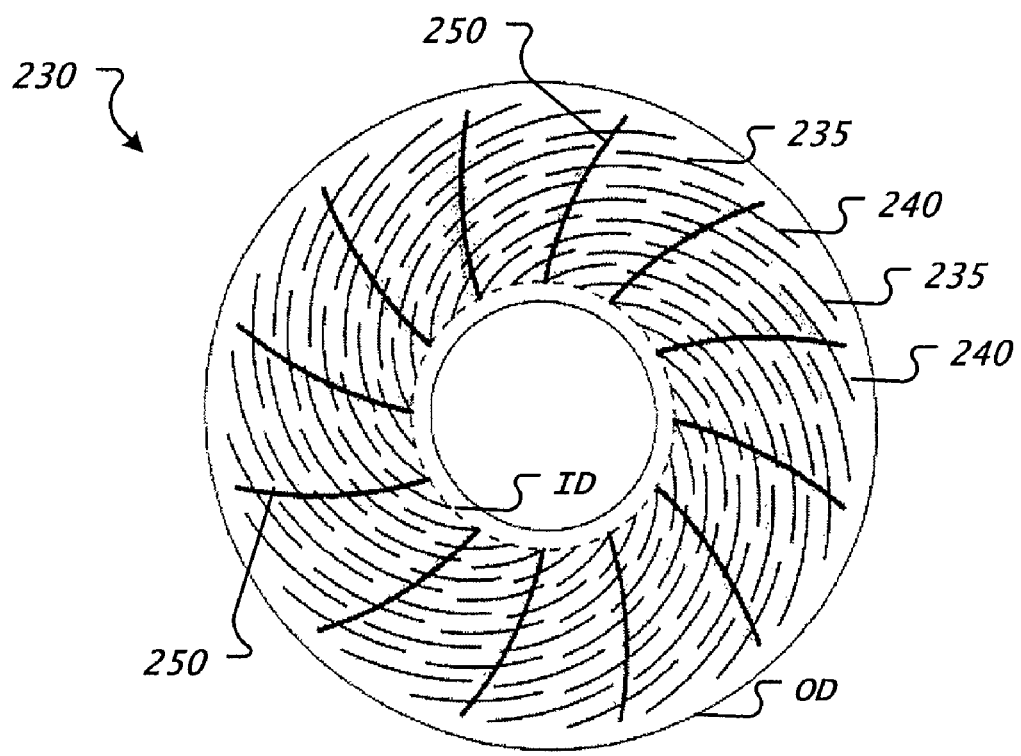

FIG. 2B shows a different example of helicoid patterns written on a recordable medium. Recordable medium 230 includes helicoid patterns in multiple helicoid groups, such as helicoid groups 235, 240. A helicoid pattern of medium 230 can start at the ID or at a point between the ID and the OD of medium 230. A helicoid pattern of medium 230 can end at the OD or at a point between the ID and the OD of medium 230. Implementations of medium 230 can have a different number of helicoid patterns and helicoid groups than those depicted. In some implementations, helicoid patterns of one helicoid group can alternate with helicoid patterns of one or more different helicoid groups. In some implementations, helicoid patterns can be used to position a head to write servo information 250 such as servo wedges across multiple tracks to medium 230. Different implementations can have different arrangements of servo information 250.

Figure 3A:
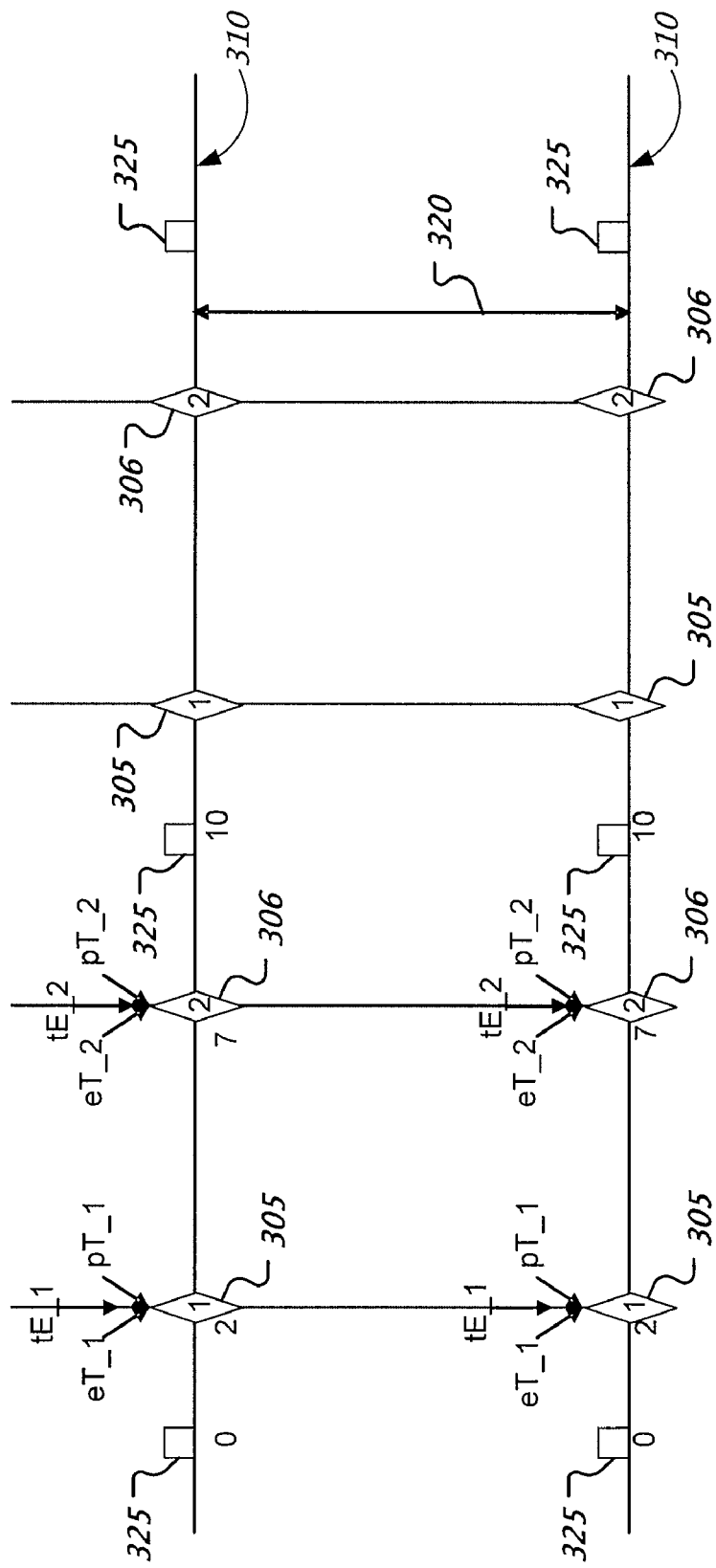
FIGS. 3A, 3B, 3C show examples of multiple helicoid patterns crossing target tracks.
Figure 3B:
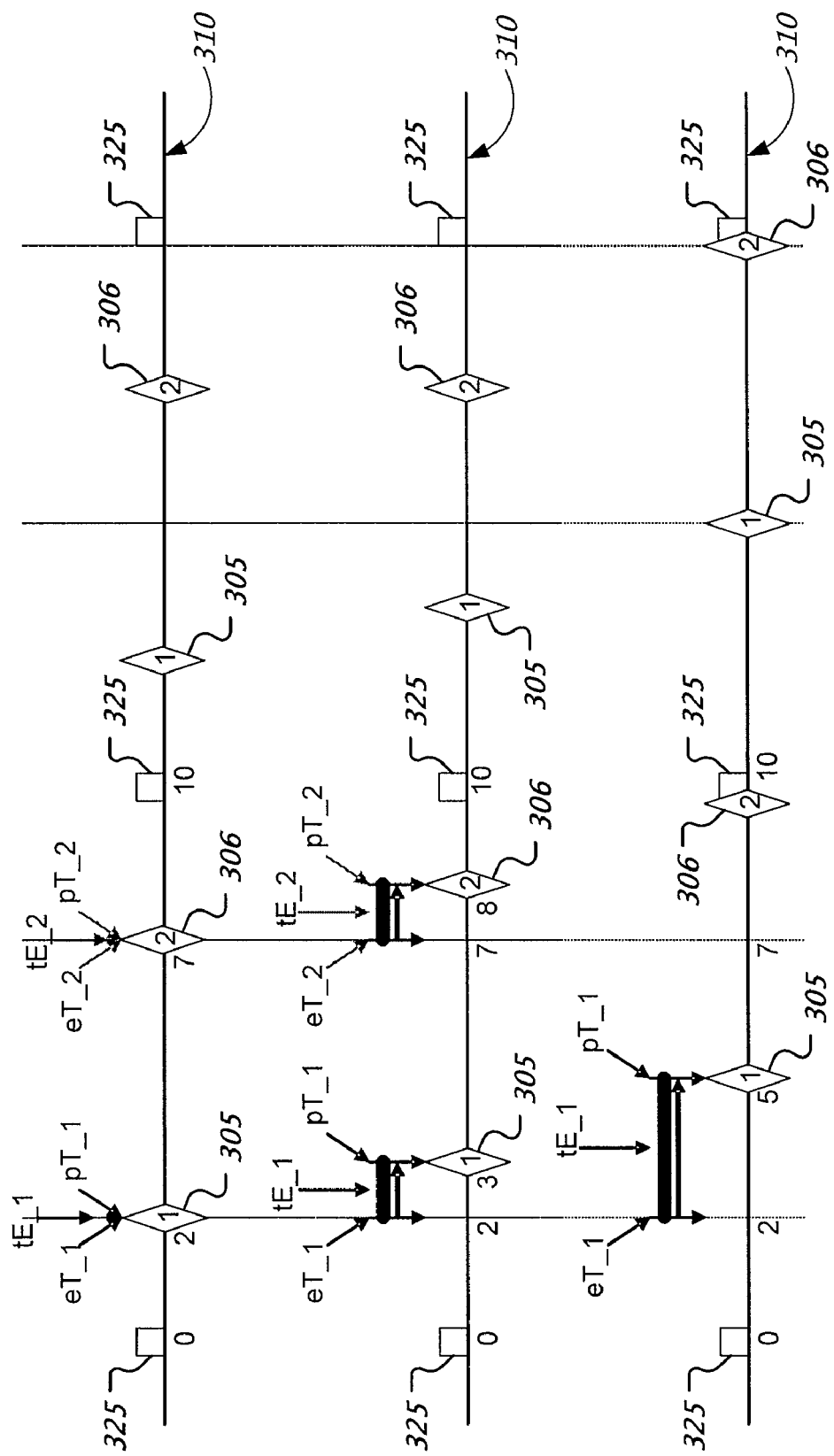
Figure 3C:
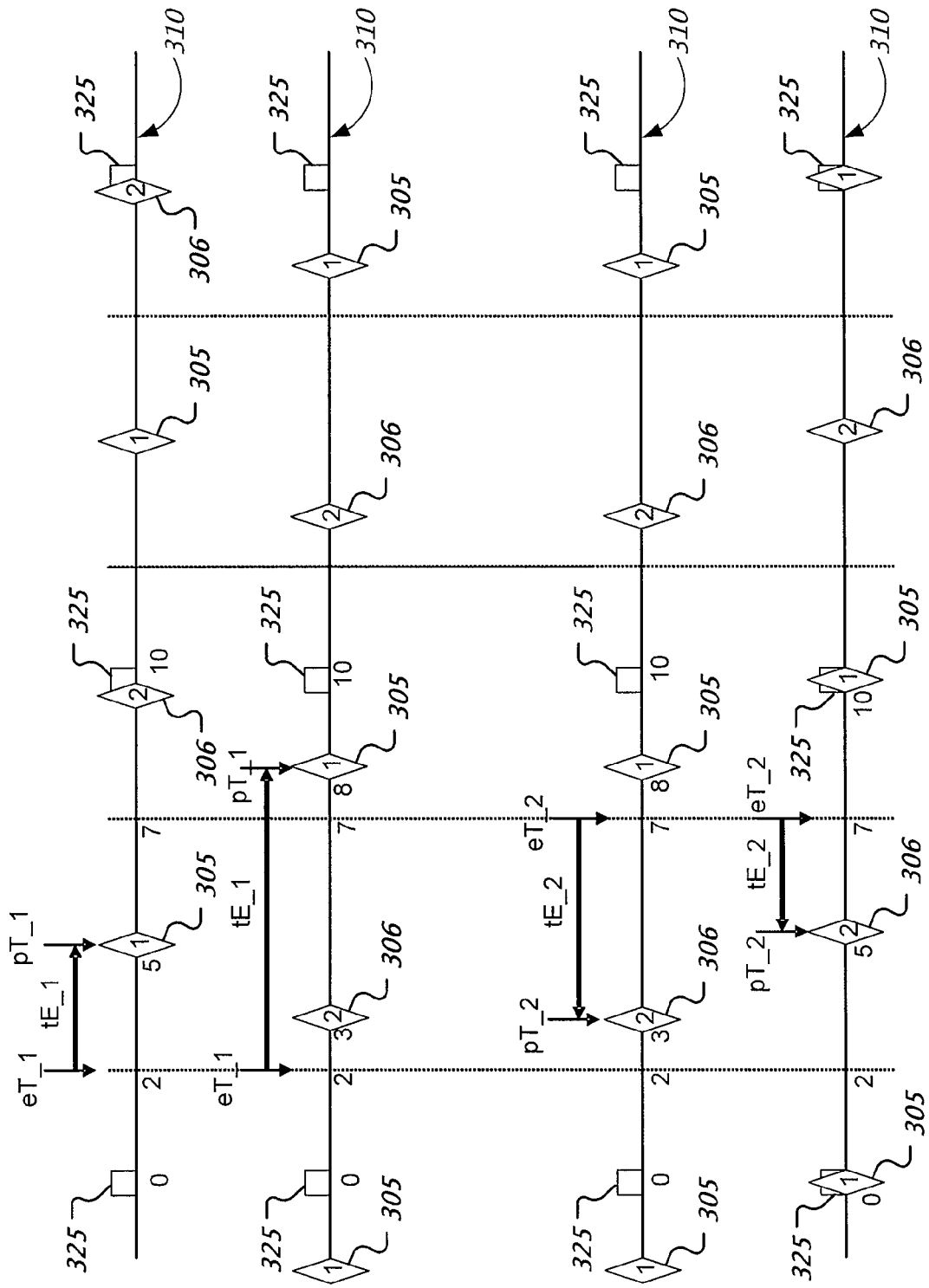

FIGS. 3A, 3B, 3C show examples of multiple helicoid patterns crossing target tracks. Helicoid patterns from multiple helicoid groups 305, 306 can cross over target tracks 310. Such helicoid patterns can be used to operate a head to write servo information such as servo wedges 325 into target areas. When a head follows a target track 310, the helicoid patterns can create diamond shaped pattern amplitudes within a waveform produced by the head. A helicoid pattern can cross a target track 310 within the vicinity or on top of a targeted area. Such track crossing hinders the use of said helicoid pattern for track following purposes. However, a helicoid pattern that crosses the same target track, but further away from said vicinity, can be used instead for track following purposes.

The peaks of helicoid patterns of helicoid groups 305, 306, e.g., a top or a bottom of a diamond shaped amplitude, can be predicted. A peak prediction can include an expected time for the peak to occur. When a peak does occur, a present time can be noted for the peak. The difference between the present time and the expected time is referred to as a tracking time difference and can be used to compute a measured location value. A measured location value yields position information about a head that can be used to center a head over a target track. A measured location value can be expressed as a sum between an initial value and an offset. The offset can be expressed as a difference between an expected time and an actual time with the difference being multiplied by a slope, e.g., space between helicoids crossing different tracks divided by a time between two different helicoids separately crossing a track. The measured location value can also include a component representing a space between helicoid patterns of different tracks that is expressed in units of tracks, e.g., separation 320 represents a separation between two different target tracks 310. The measured location, a diamond shaped pattern peak location, or a demodulation window location can be used to indicate if a helicoid group switch is needed when a diamond shaped pattern approaches the location of a target write location such as a target location for a servo wedge.

With respect to helicoid group 305 in FIGS. 3A, 3B, and 3C, expected time is represented as $eT\_1$, present time as $pT\_1$, and tracking time different as $tE\_1$. With respect to helicoid group 306 in FIGS. 3A, 3B, and 3C, expected time is represented as $eT\_2$, present time as $pT\_2$, and tracking time different as $tE\_2$. The numbers immediately below target tracks 310 represent a measure of time. In the examples of FIG. 3B, three different tracking time differences are shown for $tE\_1$: 0 (2-2), 1 (3-2), and 3 (5-2) and two for $tE\_2$: 0 (7-7) and 1 (8-7). By using the tracking time difference as a target, a read/write head can be moved from one location to the other for writing a servo track pattern. FIG. 3C shows an example of switching the time reference from $tE\_1$ to $tE\_2$ upon the helicoid group switching from group 1 to group 2. The helicoid group switching should typically occur before group 1 overlaps a target location where servo track pattern will be written.

Figure 4:
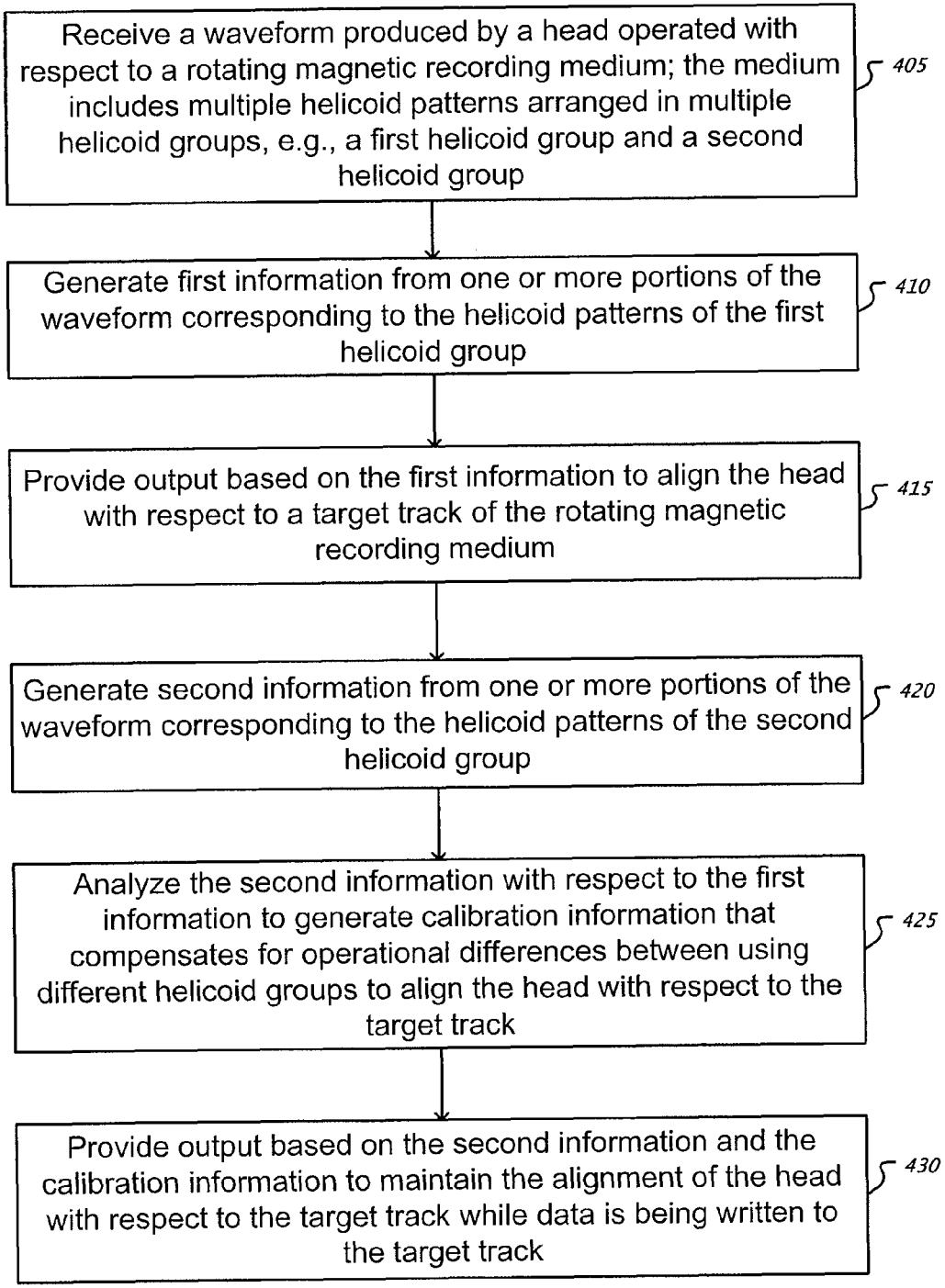
FIG. 4 shows an example of generating calibration information.

FIG. 4 shows an example of generating calibration information. Processor electronics, such as a processor or a controller, e.g., controller 180, can receive 405 a waveform produced by a head operated with respect to a rotating magnetic recording medium. The magnetic recording medium can include multiple helicoid patterns arranged in multiple helicoid groups, e.g., a first helicoid group and a second helicoid group. The circuitry can generate 410 first information from one or more portions of the waveform corresponding to the helicoid patterns of the first helicoid group. An output based on the first information can be provided 415 to align the head with respect to a target track of the rotating magnetic recording medium. The circuitry can generate 420 second information from one or more portions of the waveform corresponding to the helicoid patterns of the second helicoid group. The circuitry can analyze 425 the second information with respect to the first information to generate calibration information. The calibration information can compensate for operational differences between using different helicoid groups to align the head with respect to the target track. An output based on the second information and the calibration information can be provided 430 to maintain the alignment of the head with respect to the target track while data is being written to the target track. In some implementations, the outputs of 415 and 430 can be used to operate devices such as servo controller 160.

Figure 5:
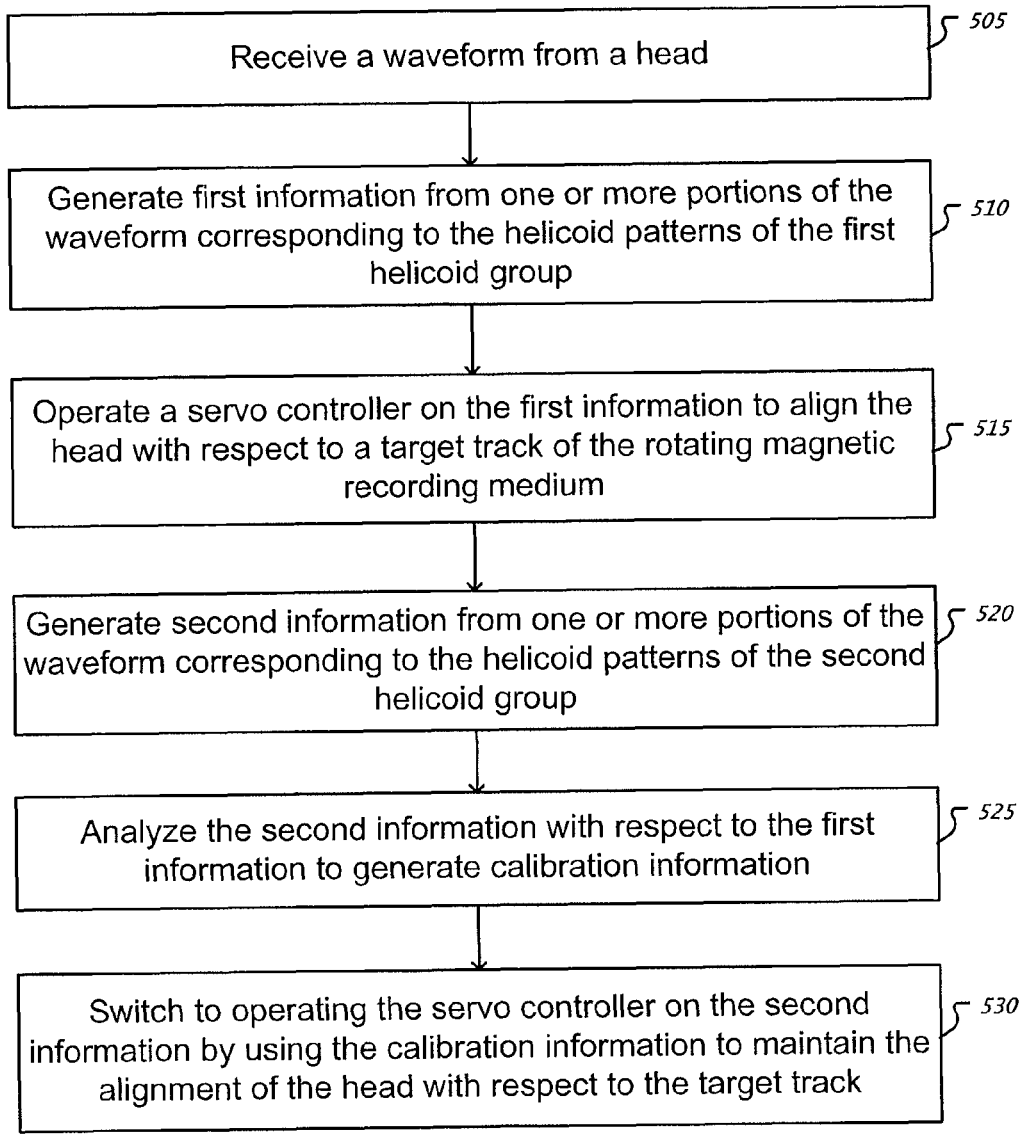
FIG. 5 shows an example of disk drive operations.

FIG. 5 shows an example of disk drive operations. In some implementations, a disk drive can include a magnetic recording medium such as disk(s) 110, a read-write head such as head 132, a servo controller such as servo controller 160, and processor electronics such as a processor or a controller. A processor can receive 505 a waveform from a head. The processor can generate 510 first information from one or more portions of the waveform corresponding to the helicoid patterns of the first helicoid group. The processor can operate 515 a servo controller on the first information to align the head with respect to a target track of the rotating magnetic recording medium. The processor can generate 520 second information from one or more portions of the waveform corresponding to the helicoid patterns of the second helicoid group. The processor can analyze 525 the second information with respect to the first information to generate calibration information. The processor can switch 530 to operating the servo controller on the second information by using the calibration information to maintain the alignment of the head with respect to the target track.

Figure 6:
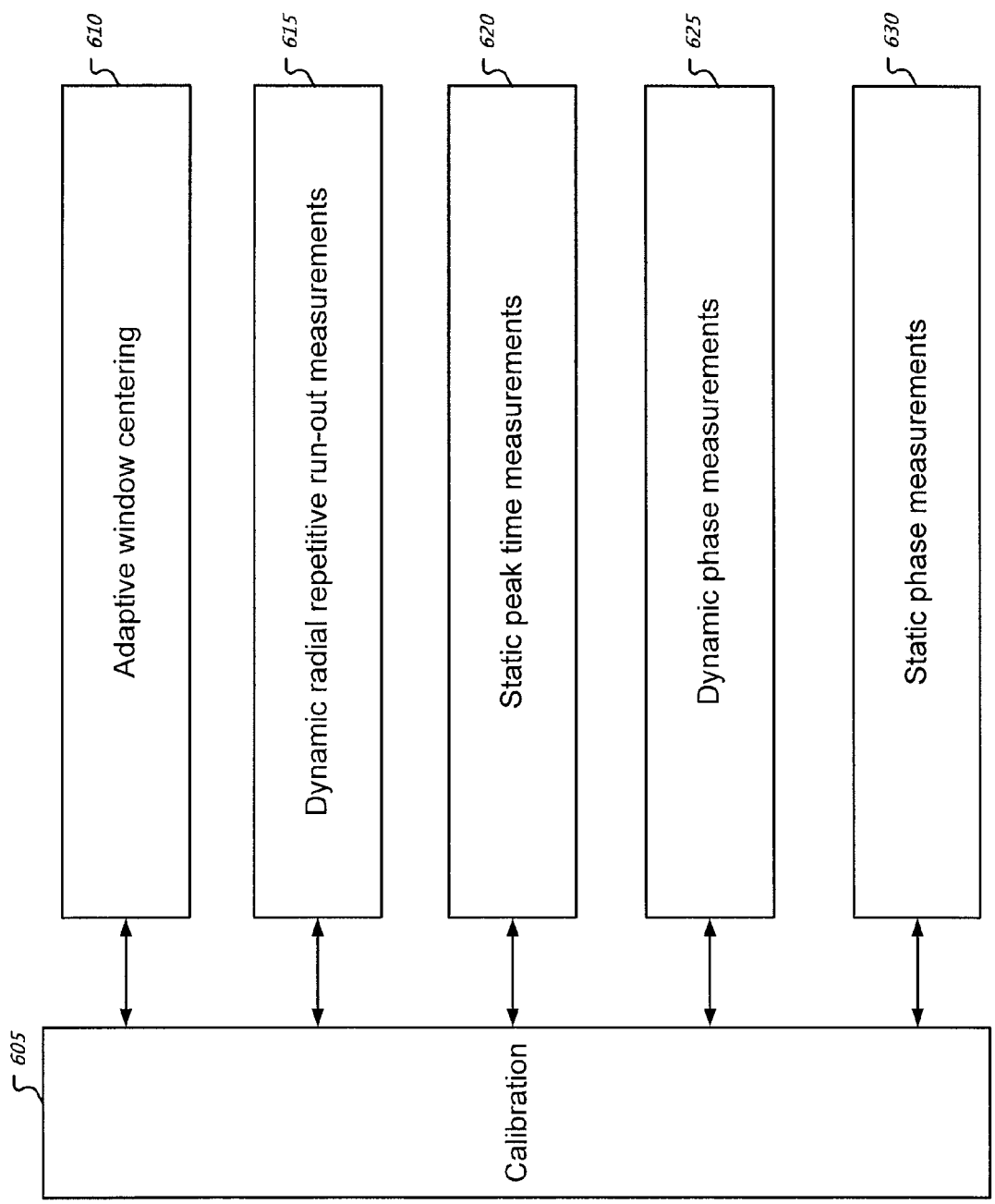
FIG. 6 shows an example of a calibration process.

FIG. 6 shows an example of a calibration process. Calibration process 605 can include one or more calibration techniques such as adaptive window centering 610, dynamic radial repetitive run-out measurements 615, static peak time measurements 620, dynamic phase measurements 625, and static phase measurements 630. These techniques can be used in the transferring of servo controls from an active helicoid group, e.g., a group currently used for servo control, to a different helicoid group. A group that is not currently being used for servo control is referred to as an in-active helicoid group.

Adaptive window centering 610 can be used for to enhance helicoid pattern time measurements and helicoid synchronization mark detection. Adaptive window centering 610 can be used in phase difference computations. Helicoid patterns can include data such as synchronization frames. For example, the helicoid patterns of a first helicoid group and a second helicoid group can include multiple synchronization frames. Helicoid patterns written to a disk can have timing and velocity errors that change radially. The active helicoid group can be continually centered in a demodulation window. However, without adaptive window centering 610, an inactive helicoid group can become miss-aligned to the point that some helicoid patterns do not appear within the group's demodulation window.

Figure 7:
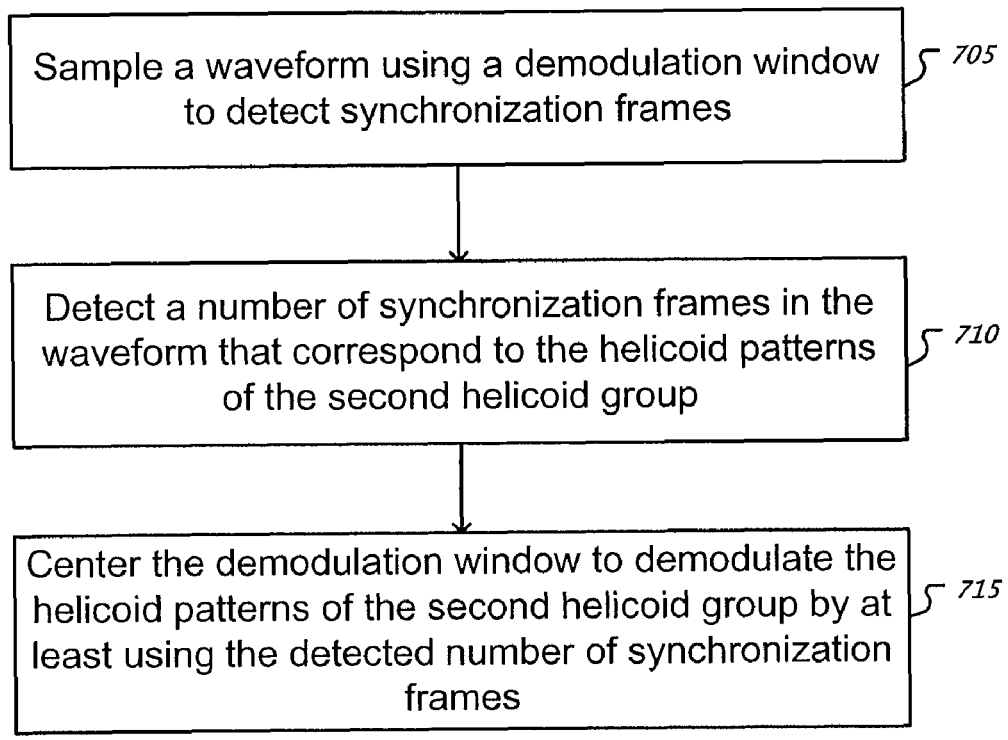
FIG. 7 shows an example of a calibration process using adaptive window centering.

FIG. 7 shows an example of a calibration process using adaptive window centering. Adaptive window centering 610 can sample 705 a waveform using a demodulation window to detect synchronization frames. One or more synchronization frames can be detected 710 in the samples. These synchronization frames can correspond to the helicoid patterns of the second helicoid group. The demodulation window can be centered 715 to demodulate the helicoid patterns of the second helicoid group by at least using the detected number of synchronization frames. In some implementations, the demodulation window can be adaptively centered, e.g., the demodulation window is adjusted and subsequently re-adjusted to increase the number of synchronization frames being detected in the demodulation window. In some implementations, the calibration process can operate multiple demodulation windows respectively corresponding to multiple helicoid groups.

In some implementations, if a specified number of synchronization frames are not found in a demodulation window, a Current Coarse Adjust value can be initialized or updated. Adaptive window centering 610 can be repeated with the demodulation window adjusted by the Current Coarse Adjust value. Once a specified window yields a sufficient number of synchronization frames, a new window value can be calculated by using the following equation: New Window Adjust=Peak Time−Predicted Peak Time+Current Window Adjust+Current Coarse Adjust. The peak time and predicted peak time values refer to the current measured peak time and the targeted peak time of a helicoid pattern in a demodulation window. In some examples, a sufficient number of synchronization frames can be between 25% and 75% of the expected number of synchronization frames when the pattern is centered in the demodulation window.

In some contingencies, the disk can be, or can become, misaligned with respect to the axis of rotation. In other contingencies, the servo information written to the disk may not have been written correctly. As a result of one or more of these contingencies in some implementations, an actuator current which drives an actuator mechanically coupled with the read-write head must be adjusted to track-follow even when there are no other external forces or disturbances. The repetitive portion of these built-in disturbances is commonly known as repetitive run-out (RRO).

In some implementations, the RRO phenomenon may be compensated for by analyzing the actuator current during servo track following. The built-in RRO can be characterized by dividing the actuator current by a position-to-current transfer function of the servo control system. The run-out values can then be subtracted from the position error signal (PES) to compensate for the built-in RRO disturbance of the disk drive. The process of characterizing the repetitive run-out values over the circumference of a disk can be a fairly long process of averaging many revolutions of servo signals to suppress noise that exists in the system. However, measurements such as dynamic radial repetitive run-out measurements 615 can be used to shorten a process for RRO compensation.

Dynamic radial repetitive run-out measurements 615 can be used to initialize and decrease radial repetitive run-out convergence time. Prior to switching helicoid groups, the active helicoid group can be used to align a head such that the head follows a circle over the rotating disk. In other words, one or more disk drive operations are responding to non-repeatable sources of position error. As a result, the detected repeatable position error is actual position.

A window adjustment is a reflection of the deviation of individual helicoid patterns from an expected location. The adjustment can be measured in time, but can be translated into a radial position deviation. A calibration process can determine a window adjustment for an in-active helicoid group and translate the adjustment into a radial position deviation. The radial position deviation can seed a radial repetitive run-out estimate for an in-active helicoid group to reduce the convergence time of a radial repetitive run-out estimate routine. A radial repetitive run-out estimate routine can be performed for one or more of the helicoid groups of a disk. Examples of radial repetitive run-out estimate routines such as a routine for repeatable run-out compensation appear in U.S. Pat. No. 6,775,091. These routines can provide estimates that can be initialized with a specified value. For example, the calibration process can initialize an estimate with a seed value; a radial repetitive run-out estimate routine can continue to update the estimates adaptively starting from the seed value.

Figure 8:
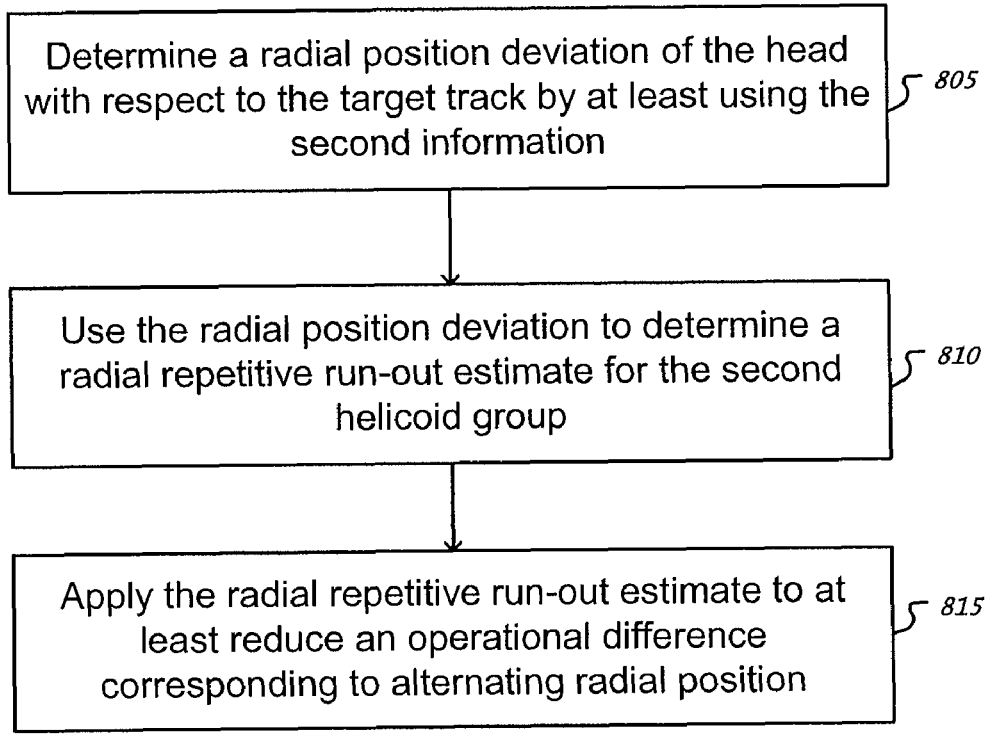
FIG. 8 shows an example of a calibration process using dynamic radial repetitive run-out measurements.

FIG. 8 shows an example of a calibration process using dynamic radial repetitive run-out measurements. A radial position deviation of the head with respect to the target track can be determined 805 by at least using the second information. The process can use 810 the radial position deviation to determine a radial repetitive run-out estimate for the second helicoid group. The process can apply 815 the radial repetitive run-out estimate to at least reduce an operational difference corresponding to alternating radial position, e.g., sinusoidal head variations about a track. In some implementations, the process can adjust a demodulation window to demodulate the helicoid patterns of the second helicoid group and to produce an adjustment value, and can use the adjustment value to define the radial position deviation.

Static peak time measurements 620 of helicoid patterns can be used to determine a static timing offset to compensate for operational differences such as radial position. The static timing offset can be used to preserve the radial position of the head during helicoid group switching. In other words, the offset can minimize or eliminate physical head motion during a switch. A static timing offset can be represented by a difference between an expected helicoid pattern peak time and a measured average helicoid pattern peak time of an in-active helicoid group.

The measured helicoid pattern peak time average can be defined as an average of K consecutive raw individual helicoid pattern peak times. A helicoid pattern peak time correction value can be defined as the difference between an expected helicoid pattern peak time and a measured helicoid pattern peak time average. The expected helicoid pattern peak time is a target value that can be computed from the active helicoid group. Individual corrected helicoid group peek times can be defined as the differences between raw individual helicoid pattern peak times and the helicoid pattern peak time correction.

Figure 9:
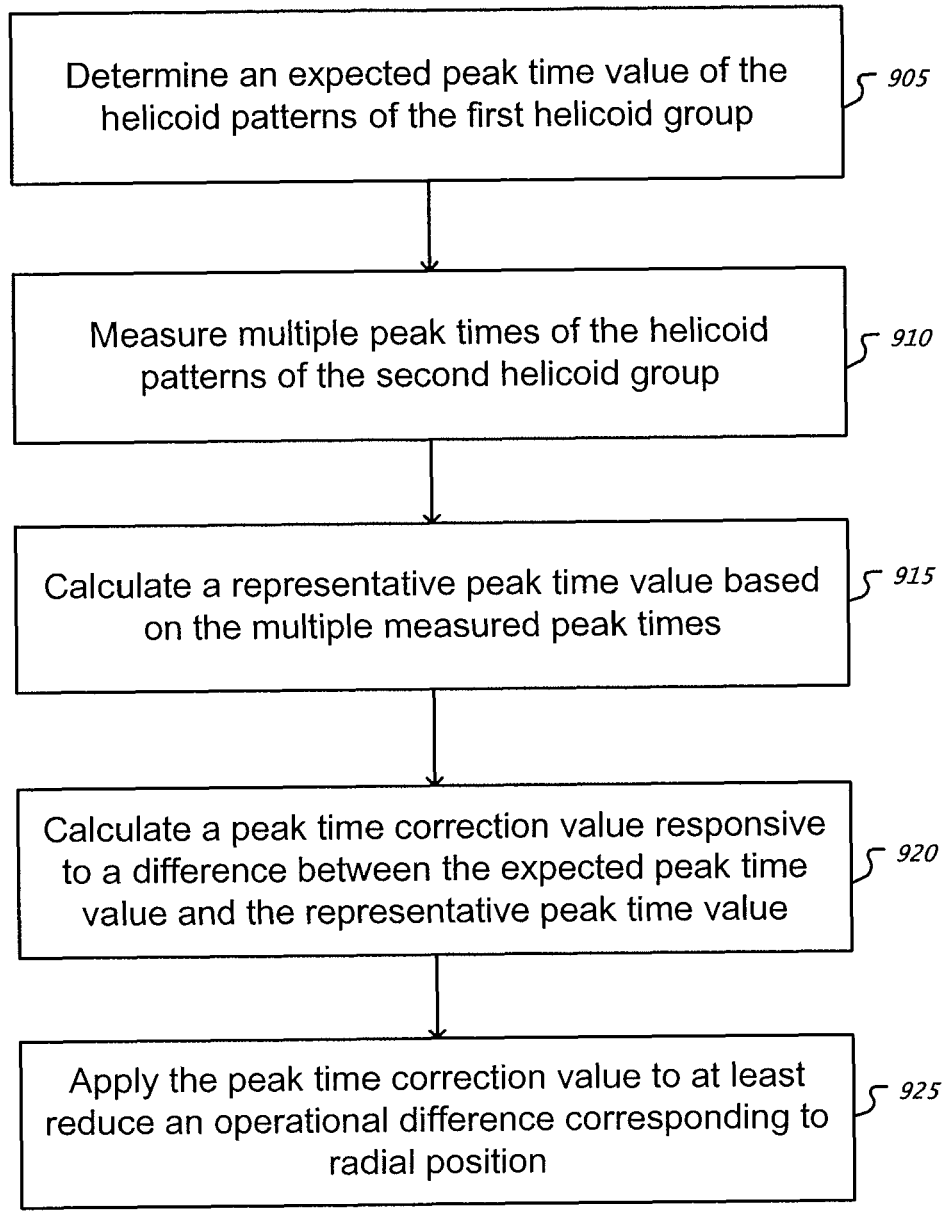
FIG. 9 shows an example of a calibration process using static peak time measurements.

FIG. 9 shows an example of a calibration process using static peak time measurements. In some implementations, static time measurements 620 can be performed after performing adaptive window centering 610 on a corresponding demodulation window. The calibration process can determine 905 an expected peak time value of the helicoid patterns of the first helicoid group. The calibration process can measure 910 multiple peak times of the helicoid patterns of the second helicoid group. A representative peak time value can be calculated 915 by using the multiple measured peak times. A peak time correction value can be calculated 920 by using a difference between the expected peak time value and the representative peak time value. A disk drive operation can apply 925 the peak time correction value to at least reduce an operational difference corresponding to radial position.

Performing dynamic phase measurements 625 can detect dynamic timing, e.g., sinusoidal variations in timing, operational differences. In some implementations, a phase-locked loop (PLL) can be used to control timing and minimize dynamic timing operational differences. While operating a PLL on the active helicoid group, a phase difference, also called a phase error, on an in-active helicoid group can be monitored.

A phase error can include static and dynamic parts such as alternating phase difference components and static phase difference components. Individual alternating phase differences for each helicoid pattern can be generated by comparing a timestamp from a selected frame within a helicoid group demodulation window and an expected helicoid pattern timestamp. An alternating phase difference can be defined as an average measurement on each individual helicoid pattern phase difference after subtracting a static phase component. In other words, a sum of individual alternating phase differences can equal zero.

Initializing a phase repetitive run-out estimate routine with information derived from dynamic phase measurements such as alternating phase difference components can reduce convergence time of the estimate routine. An output of a phase repetitive run-out estimate routine can be applied on the active helicoid group such that a PLL does not respond to repetitive phase errors of the active helicoid group. As a result, the alternating phase difference components on an in-active helicoid group can be measured and applied to initialize a phase repetitive run-out estimate routine for the in-active helicoid group.

Phase repetitive run-out compensation can be implemented as a table based feed-forward mechanism within a servo control system. This table can be adaptively updated to track changes during disk drive operations. Using the measured alternating phase differences to initialize the feed-forward table can reduce convergence time in a phase repetitive run-out compensation routine when compared with no such initialization. In some implementations, alternating phase differences can be represented in an array that contains an entry for each individual helicoid pattern of interest.

Figure 10:
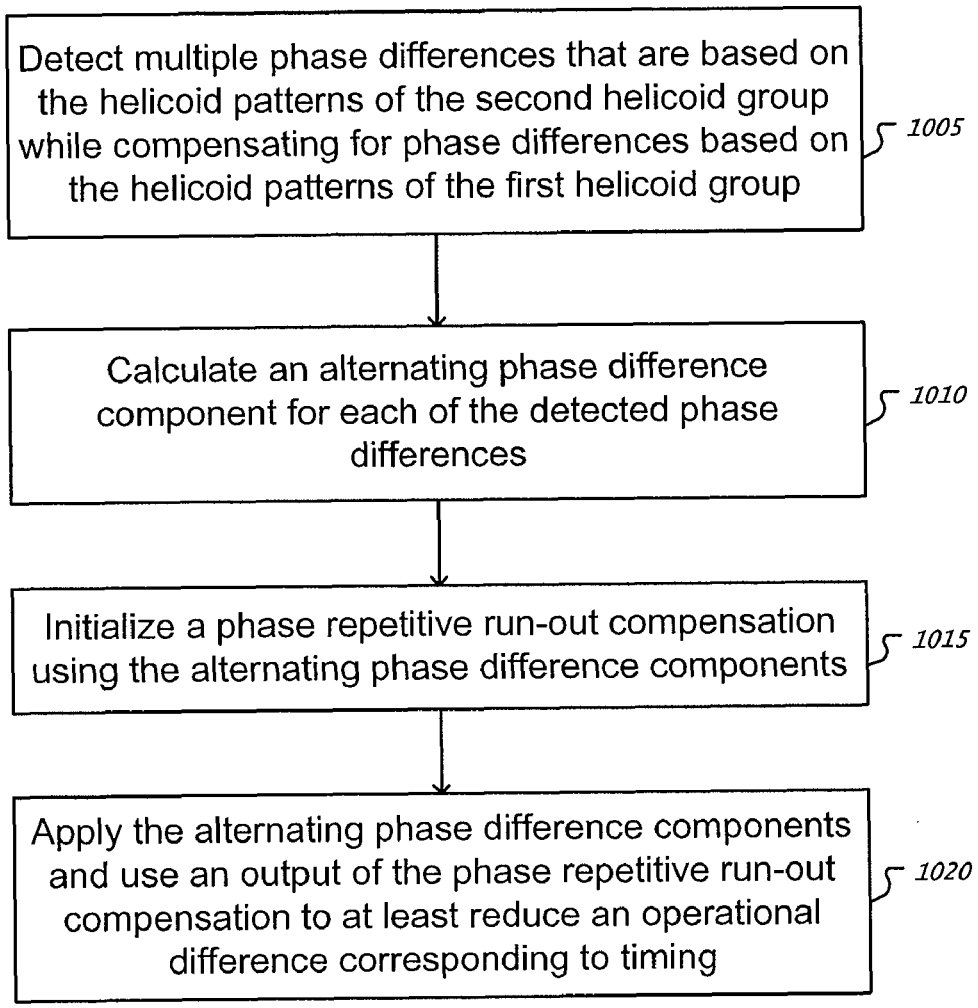
FIG. 10 shows an example of a calibration process using dynamic phase measurements.

FIG. 10 shows an example of a calibration process using dynamic phase measurements. The calibration process can detect 1005 multiple phase differences that are based on the helicoid patterns of the second helicoid group while compensating for phase differences based on the helicoid patterns of the first helicoid group. Each detected phase difference can be responsive to a difference between a timestamp derived from a portion of the waveform that corresponds to a helicoid pattern of the second helicoid group and an expected timestamp. The calibration process can calculate 1010 an alternating phase difference component for each of the detected phase differences. The calibration process can initialize 1015 a phase repetitive run-out compensation using the alternating phase difference components. A disk drive operation can apply 1020 the alternating phase difference components. The calibration process can use an output of the phase repetitive run-out compensation to at least reduce an operational difference corresponding to timing. In some implementations, the alternating phase difference components can be stored as initial values in a feed-forward table. The initial values can be updated by using phase repetitive run-out compensation.

Static phase measurements 630 can be used to switch PLL controls from the active helicoid group to a different helicoid group while mitigating or eliminating static timing drift during the switch. Without compensation, a static phase difference measured on an in-active helicoid group can create a static timing drift if this in-active helicoid group becomes the active helicoid group. While operating a disk drive's servo control on the active helicoid group, the expected average phase difference can be zero for the active helicoid group. However, a non-zero average phase difference on an in-active helicoid group can result. The static phase difference can be reduced or eliminated during a helicoid group switch to prevent a static timing drift. Such a drift can cause a phase coherence problem between tracks of the disk that can render a track written right after the switch unusable.

Measured static phase difference can be defined as an average of L consecutive raw individual helicoid pattern phase differences. A helicoid group phase error correction can be defined as the measured static phase difference. Individual corrected helicoid pattern phase error can be defined as differences between raw individual helicoid pattern phase differences and the helicoid group phase error correction.

Figure 11:
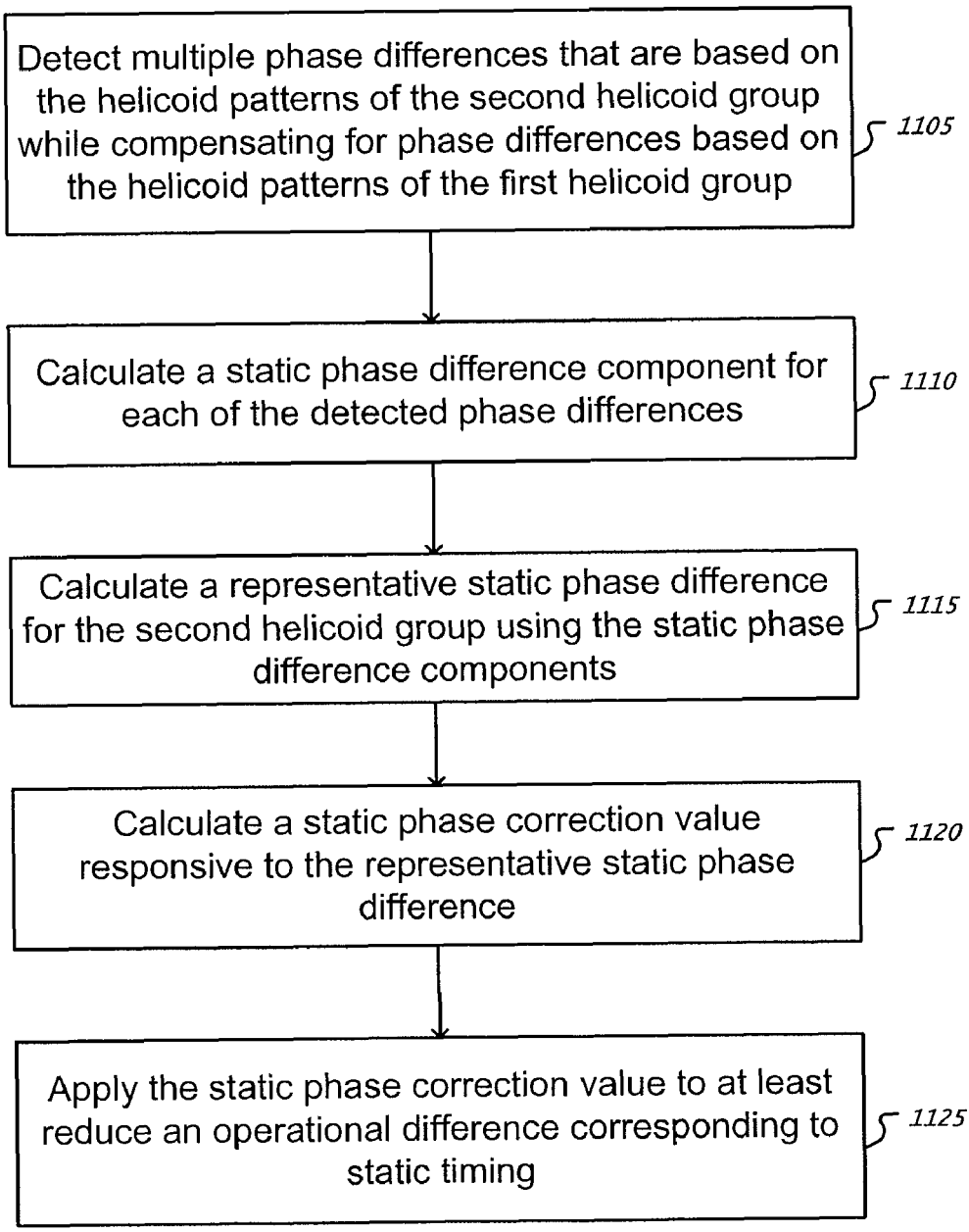
FIG. 11 shows an example of a calibration process using static phase measurements.

FIG. 11 shows an example of a calibration process using static phase measurements. The calibration process can detect 1105 multiple phase differences that are based on the helicoid patterns of the second helicoid group while compensating for phase differences based on the helicoid patterns of the first helicoid group. Each detected phase difference can be responsive to a difference between a timestamp derived from a portion of the waveform that corresponds to a helicoid pattern of the second helicoid group and an expected timestamp. The calibration process can calculate 1110 a static phase difference component for each of the detected phase differences, can calculate 1115 a representative static phase difference for the second helicoid group using the static phase difference components, and can calculate 1120 a static phase correction value responsive to the representative static phase difference. A disk drive operation can apply 1125 the static phase correction value to at least reduce an operational difference corresponding to static timing.

In some implementations, calibration methods on an inactive helicoid group can be performed while controlling a servo on the active helicoid group. Such calibration methods can include centering spiral windows for reliable spiral decoding; measuring Alternating Current (AC) repeatable phase errors as correction values; measuring Direct Current (DC) average spiral phase error for smooth transfer of PLL control; measuring DC spiral peak timing; and measuring AC radial RRO to compensate for zero radial motion during transfer of spiral servo, e.g., helicoid group switching.

Figure 12A:
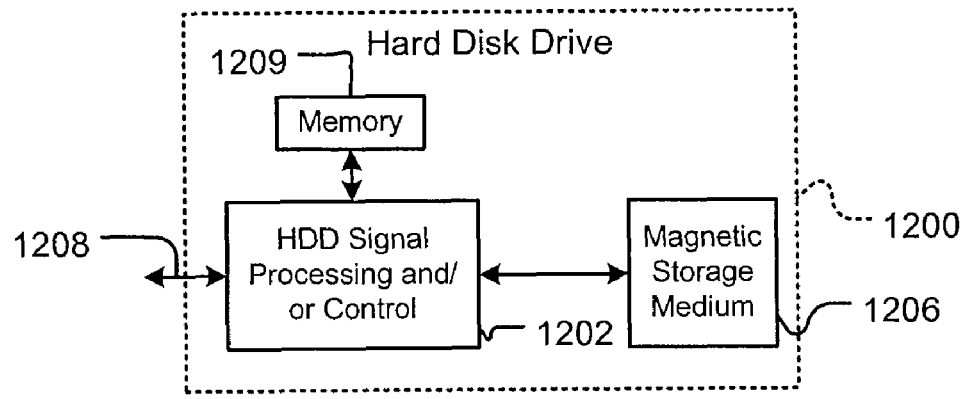
FIGS. 12A, 12B, 12C, 12D, 12E, 12F, and 12G show different implementations of the described systems and techniques.

FIGS. 12A-12G show different implementations of the described systems and techniques. In FIG. 12A, the described systems and techniques can be implemented in a hard disk drive (HDD) 1200. The described systems and techniques may be implemented in either or both signal processing and/or control circuits, which are generally identified in FIG. 12A at 1202. In some implementations, the signal processing and/or control circuit 1202 and/or other circuits (not shown) in the HDD 1200 may process data, perform coding and/or encryption, perform calculations, and/or format data that is output to and/or received from a magnetic storage medium 1206.

The HDD 1200 may communicate with a host device (not shown) such as a computer, mobile computing devices such as personal digital assistants, cellular phones, media or MP3 players and the like, and/or other devices via one or more wired or wireless communication links 1208. The HDD 1200 may be connected to memory 1209 such as random access memory (RAM), low latency nonvolatile memory such as flash memory, read only memory (ROM) and/or other suitable electronic data storage.

Figure 12B:
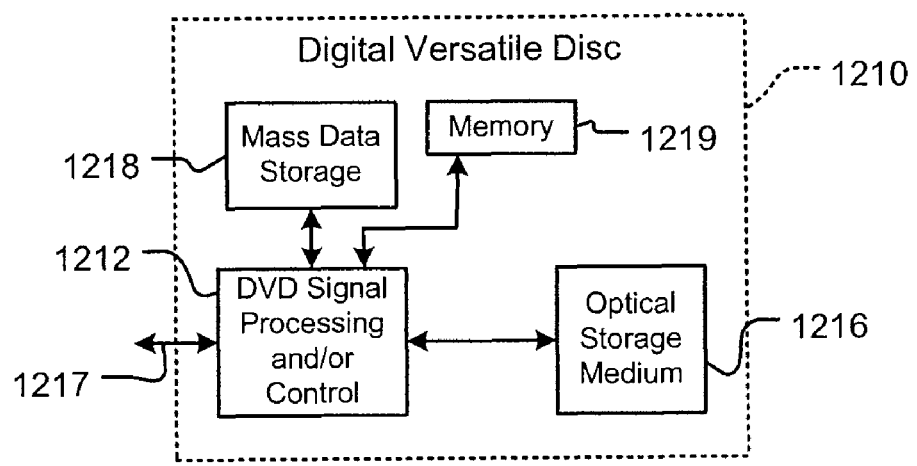

In FIG. 12B, the described systems and techniques can be implemented in a digital versatile disc (DVD) drive 1210. The described systems and techniques may be implemented in either or both signal processing and/or control circuits, which are generally identified in FIG. 12B at 1212, and/or mass data storage of the DVD drive 1210. The signal processing and/or control circuit 1212 and/or other circuits (not shown) in the DVD drive 1210 may process data, perform coding and/or encryption, perform calculations, and/or format data that is read from and/or data written to an optical storage medium 1216. In some implementations, the signal processing and/or control circuit 1212 and/or other circuits (not shown) in the DVD drive 1210 can also perform other functions such as encoding and/or decoding and/or any other signal processing functions associated with a DVD drive.

The DVD drive 1210 may communicate with an output device (not shown) such as a computer, television or other device via one or more wired or wireless communication links 1217. The DVD drive 1210 may communicate with mass data storage 1218 that stores data in a nonvolatile manner. The mass data storage 1218 may include a hard disk drive (HDD). The HDD may have the configuration shown in FIG. 12A. The HDD may be a mini HDD that includes one or more platters having a diameter that is smaller than approximately 1.8". The DVD 1210 may be connected to memory 1219 such as RAM, ROM, low latency nonvolatile memory such as flash memory and/or other suitable electronic data storage.

Figure 12C:
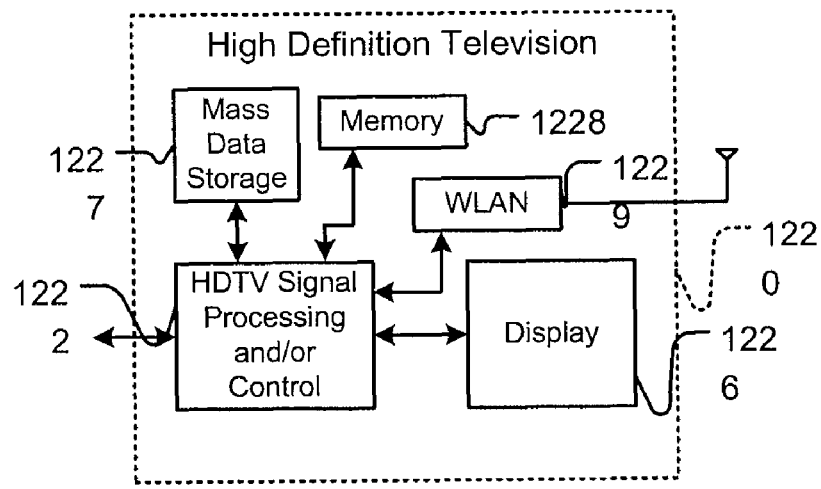

In FIG. 12C, the described systems and techniques can be implemented in a high definition television (HDTV) 1220. The described systems and techniques may be implemented in either or both signal processing and/or control circuits, which are generally identified in FIG. 12C at 1222, a WLAN interface and/or mass data storage of the HDTV 1220. The HDTV 1220 receives HDTV input signals in either a wired or wireless format and generates HDTV output signals for a display 1226. In some implementations, signal processing circuit and/or control circuit 1222 and/or other circuits (not shown) of the HDTV 1220 may process data, perform coding and/or encryption, perform calculations, format data and/or perform any other type of HDTV processing that may be required.

The HDTV 1220 may communicate with mass data storage 1227 that stores data in a nonvolatile manner such as optical and/or magnetic storage devices, for example, hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The HDTV 1220 may be connected to memory 1228 such as RAM, ROM, low latency nonvolatile memory such as flash memory and/or other suitable electronic data storage. The HDTV 1220 also may support connections with a WLAN via a WLAN interface 1229.

Figure 12D:
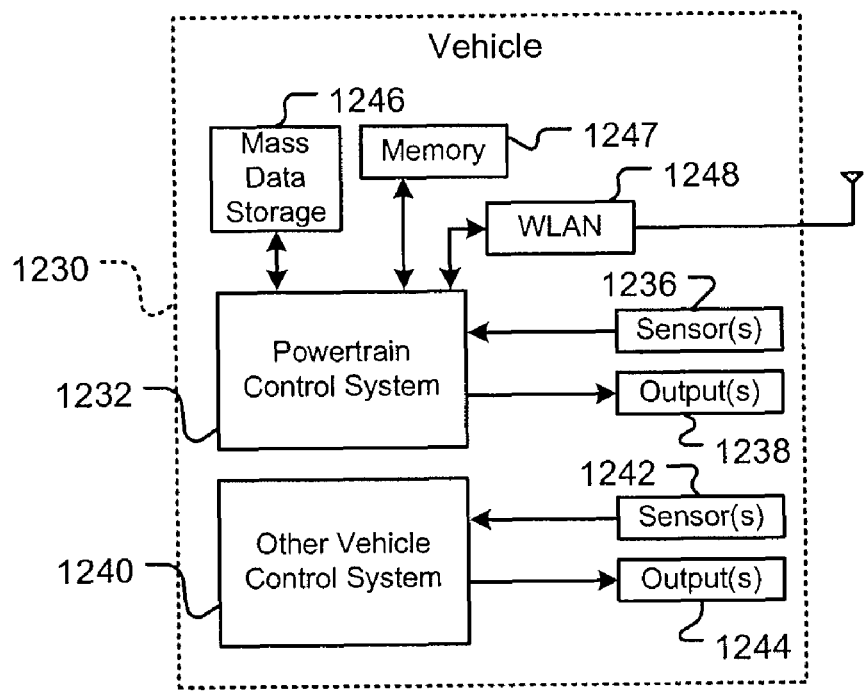

In FIG. 12D, the described systems and techniques may be implemented in a control system of a vehicle 1230, a WLAN interface and/or mass data storage of the vehicle control system. In some implementations, the described systems and techniques may be implemented in a powertrain control system 1232 that receives inputs from one or more sensors such as temperature sensors, pressure sensors, rotational sensors, airflow sensors and/or any other suitable sensors and/or that generates one or more output control signals such as engine operating parameters, transmission operating parameters, braking parameters, and/or other control signals.

The described systems and techniques may also be implemented in other control systems 1240 of the vehicle 1230. The control system 1240 may likewise receive signals from input sensors 1242 and/or output control signals to one or more output devices 1244. In some implementations, the control system 1240 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1232 may communicate with mass data storage 1246 that stores data in a nonvolatile manner. The mass data storage 1246 may include optical and/or magnetic storage devices, for example, hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The powertrain control system 1232 may be connected to memory 1247 such as RAM, ROM, low latency nonvolatile memory such as flash memory and/or other suitable electronic data storage. The powertrain control system 1232 also may support connections with a WLAN via a WLAN interface 1248. The control system 1240 may also include mass data storage, memory and/or a WLAN interface (all not shown).

Figure 12E:
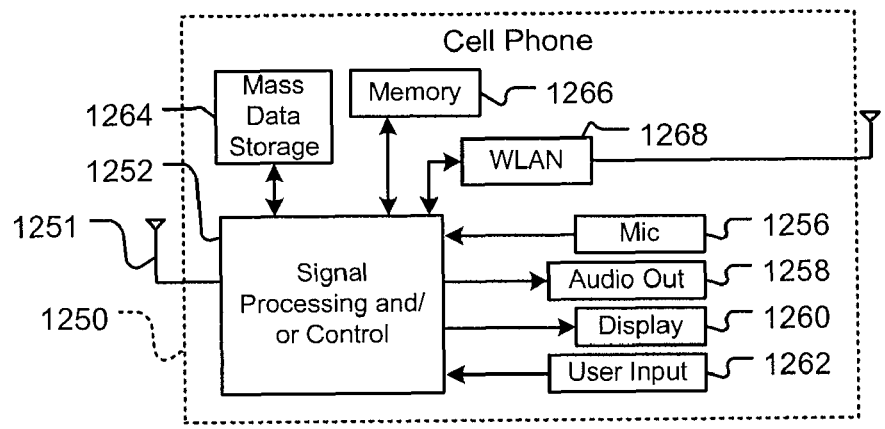

In FIG. 12E, the described systems and techniques can be implemented in a cellular phone 1250 that may include a cellular ante 12a 1251. The described systems and techniques may be implemented in either or both signal processing and/or control circuits, which are generally identified in FIG. 12E at 1252, a WLAN interface and/or mass data storage of the cellular phone 1250. In some implementations, the cellular phone 1250 includes a microphone 1256, an audio output 1258 such as a speaker and/or audio output jack, a display 1260 and/or an input device 1262 such as a keypad, pointing device, voice actuation and/or other input device. The signal processing and/or control circuits 1252 and/or other circuits (not shown) in the cellular phone 1250 may process data, perform coding and/or encryption, perform calculations, format data and/or perform other cellular phone functions.

The cellular phone 1250 may communicate with mass data storage 1264 that stores data in a nonvolatile manner such as optical and/or magnetic storage devices, for example, hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The cellular phone 1250 may be connected to memory 1266 such as RAM, ROM, low latency nonvolatile memory such as flash memory and/or other suitable electronic data storage. The cellular phone 1250 also may support connections with a WLAN via a WLAN interface 1268.

Figure 12F:
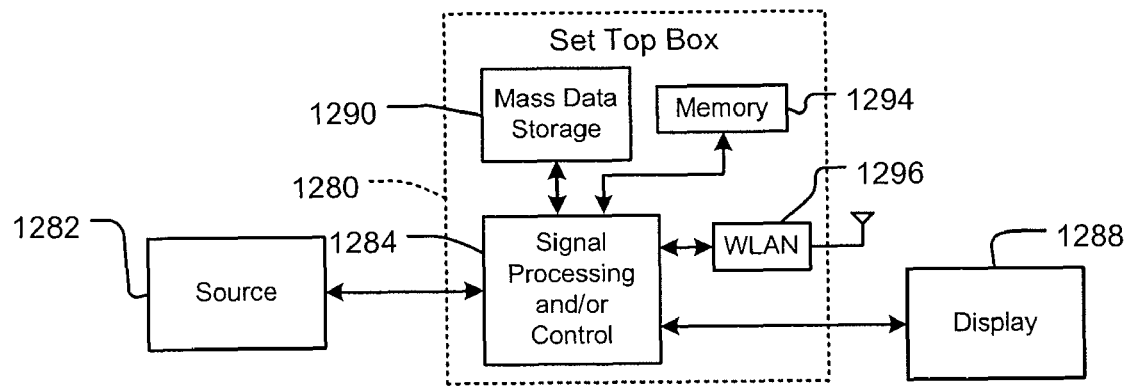

In FIG. 12F, the described systems and techniques can be implemented in a set top box 1280. The described systems and techniques may be implemented in either or both signal processing and/or control circuits, which are generally identified in FIG. 12F at 1284, a WLAN interface and/or mass data storage of the set top box 1280. The set top box 1280 receives signals from a source 1282 such as a broadband source and outputs standard and/or high definition audio/video signals suitable for a display 1288 such as a television and/or monitor and/or other video and/or audio output devices. The signal processing and/or control circuits 1284 and/or other circuits (not shown) of the set top box 1280 may process data, perform coding and/or encryption, perform calculations, format data and/or perform any other set top box function.

The set top box 1280 may communicate with mass data storage 1290 that stores data in a nonvolatile manner. The mass data storage 1290 may include optical and/or magnetic storage devices, for example, hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The set top box 1280 may be connected to memory 1294 such as RAM, ROM, low latency nonvolatile memory such as flash memory and/or other suitable electronic data storage. The set top box 1280 also may support connections with a WLAN via a WLAN interface 1296.

Figure 12G:
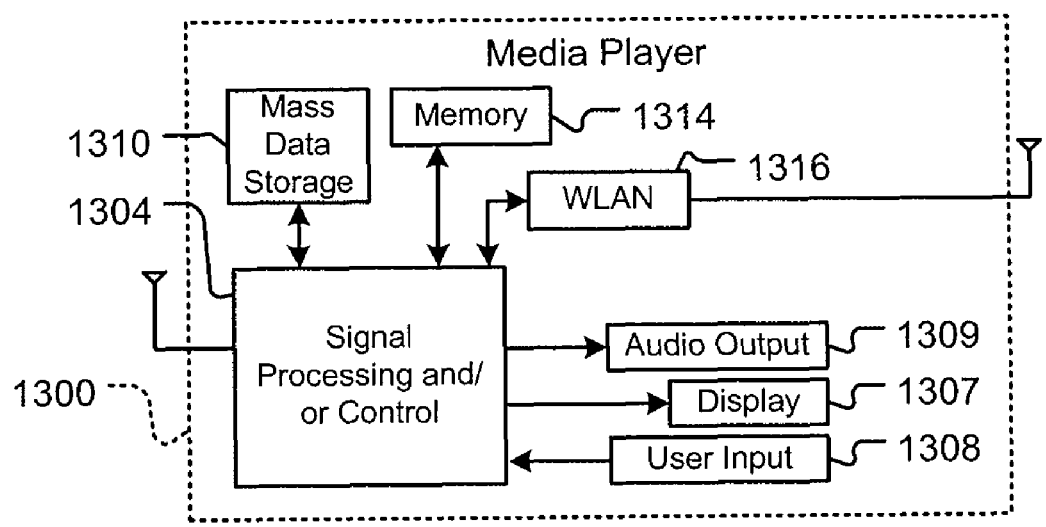

In FIG. 12G, the described systems and techniques can be implemented in a media player 1300. The described systems and techniques may be implemented in either or both signal processing and/or control circuits, which are generally identified in FIG. 12G at 1304, a WLAN interface and/or mass data storage of the media player 1300. In some implementations, the media player 1300 includes a display 1307 and/or a user input 1308 such as a keypad, touchpad and the like. In some implementations, the media player 1300 may employ a graphical user interface (GUI) that typically employs menus, drop down menus, icons and/or a point-and-click interface via the display 1307 and/or user input 1308. The media player 1300 further includes an audio output 1309 such as a speaker and/or audio output jack. The signal processing and/or control circuits 1304 and/or other circuits (not shown) of the media player 1300 may process data, perform coding and/or encryption, perform calculations, format data and/or perform any other media player function.

The media player 1300 may communicate with mass data storage 1310 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices, for example, hard disk drives and/or DVD drives. At least one HDD may have the configuration shown in FIG. 12A and/or at least one DVD drive may have the configuration shown in FIG. 12B. The HDD may be a mini HDD that includes one or more platters having a diameter that is smaller than approximately 1.8". The media player 1300 may be connected to memory 1314 such as RAM, ROM, low latency nonvolatile memory such as flash memory and/or other suitable electronic data storage. The media player 1300 also may support connections with a WLAN via a WLAN interface 1316. Still other implementations in addition to those described above are contemplated.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. A processor can receive instructions and data from a read only memory or a random access memory or both.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations may be made based on what is disclosed.

What is claimed is:

1. A method comprising:
    receiving a waveform produced by a head operated with respect to a rotating magnetic recording medium, the magnetic recording medium comprising multiple helicoid patterns arranged in a first helicoid group and a second helicoid group;
    generating first information from one or more portions of the waveform corresponding to the helicoid patterns of the first helicoid group;
    providing output based on the first information to align the head with respect to a target track of the rotating magnetic recording medium;
    generating second information from one or more portions of the waveform corresponding to the helicoid patterns of the second helicoid group;
    analyzing the second information with respect to the first information to generate calibration information, the calibration information compensating for operational differences between using the helicoid patterns of the first helicoid group and the helicoid patterns of the second helicoid group to align the head;
    providing output based on the second information and the calibration information to maintain the alignment of the head;
    first switching, from using the first information to track follow on a first target track, to using the second information to track follow on a second target track to write data to the second target track, wherein the first switching comprises using the calibration information; and
    second switching, from using the second information to track follow on the second target track, to using the first information to track follow on a third target track to write data to the third target track,
    wherein analyzing the second information with respect to the first information comprises detecting multiple phase differences that are based on the helicoid patterns of the second helicoid group while compensating for phase differences based on the helicoid patterns of the first helicoid group, each detected phase difference being responsive to a difference between a timestamp derived from at least a portion of the waveform that corresponds to a helicoid pattern of the second helicoid group and an expected timestamp.

2. The method of claim 1, wherein the calibration information compensates for operational differences being of timing and radial position.

3. The method of claim 1, wherein analyzing the second information with respect to the first information comprises:
    determining a radial position deviation of the head with respect to a target track by at least using the first information;
    using the radial position deviation to determine a radial repetitive run-out estimate for the second helicoid group;
    calculating a static phase difference component for each of the detected phase differences;
    calculating a representative static phase difference for the second helicoid group using the static phase difference components; and
    calculating a static phase correction value responsive to the representative static phase difference.

4. The method of claim 3, wherein providing output based on the second information and the calibration information comprises:
    applying the radial repetitive run-out estimate to at least reduce an operational difference corresponding to alternating radial position; and
    applying the static phase correction value to at least reduce an operational difference corresponding to static timing.

5. The method of claim 1, wherein analyzing the second information with respect to the first information comprises:
    determining a radial position deviation of the head with respect to a target track by at least using the second information; and using the radial position deviation to determine a radial repetitive run-out estimate for the second helicoid group, wherein providing output based on the second information and the calibration information comprises applying the radial repetitive run-out estimate to at least reduce an operational difference corresponding to alternating radial position.

6. The method of claim 5, wherein analyzing the second information with respect to the first information further comprises:
   adjusting a demodulation window to demodulate the helicoid patterns of the second helicoid group and to produce an adjustment value; and
   using the adjustment value to define the radial position deviation.

7. The method of claim 1, wherein analyzing the second information with respect to the first information comprises:
   determining an expected peak time value of the helicoid patterns of the first helicoid group;
   measuring multiple peak times of the helicoid patterns of the second helicoid group;
   calculating a representative peak time value based on the multiple measured peak times; and
   calculating a peak time correction value responsive to a difference between the expected peak time value and the representative peak time value,
   wherein providing output based on the second information and the calibration information comprises applying the peak time correction value to at least reduce an operational difference corresponding to radial position.

8. The method of claim 1, wherein analyzing the second information with respect to the first information further comprises:
   calculating an alternating phase difference component for each of the detected phase differences; and
   initializing a phase repetitive run-out compensation using the alternating phase difference components,
   wherein providing output based on the second information and the calibration information comprises applying the alternating phase difference components and using an output of the phase repetitive run-out compensation to at least reduce an operational difference corresponding to timing.

9. The method of claim 8, further comprising:
   storing the alternating phase difference components as initial values in a feed-forward table, wherein the initial values are updated by the phase repetitive run-out compensation.

10. The method of claim 1, wherein analyzing the second information with respect to the first information further comprises:
    calculating a static phase difference component for each of the detected phase differences;
    calculating a representative static phase difference for the second helicoid group using the static phase difference components; and
    calculating a static phase correction value responsive to the representative static phase difference,
    wherein providing output based on the second information and the calibration information comprises applying the static phase correction value to at least reduce an operational difference corresponding to static timing.

11. The method of claim 1, further comprising:
    using the output based on the first information to operate a disk drive comprising the head and the magnetic recording medium; and
    switching to using the output based on the second information and the calibration information to operate the disk drive.

12. The method of claim 1, wherein the second target track is longer than the first target track, and the third target track is longer than the second target track.

13. A method comprising:
    receiving a waveform produced by a head operated with respect to a rotating magnetic recording medium, the magnetic recording medium comprising multiple helicoid patterns arranged in a first helicoid group and a second helicoid group, wherein the helicoid patterns of the first and second helicoid groups define multiple synchronization frames;
    generating first information from one or more portions of the waveform corresponding to the helicoid patterns of the first helicoid group;
    providing output based on the first information to align the head with respect to a target track of the rotating magnetic recording medium;
    generating second information from one or more portions of the waveform corresponding to the helicoid patterns of the second helicoid group;
    analyzing the second information with respect to the first information to generate calibration information, the calibration information compensating for operational differences between using the helicoid patterns of the first helicoid group and the helicoid patterns of the second helicoid group to align the head;
    providing output based on the second information and the calibration information to maintain the alignment of the head;
    first switching, from using the first information to track follow on a first target track, to using the second information to track follow on a second target track to write data to the second target track, wherein the first switching comprises using the calibration information;
    second switching, from using the second information to track follow on the second target track, to using the first information to track follow on a third target track to write data to the third target track;
    detecting a number of synchronization frames in the waveform that correspond to the helicoid patterns of the second helicoid group using a demodulation window while providing output based on the first information; and
    adaptively centering the demodulation window to demodulate the helicoid patterns of the second helicoid group by at least using the detected number of synchronization frames.

14. The method of claim 13, wherein generating second information comprises:
    using the adaptively centered demodulation window to generate at least a portion of the second information.

15. A disk drive system comprising:
    a magnetic recording medium, the magnetic recording medium comprising multiple helicoid patterns arranged in a first helicoid group and a second helicoid group;
    a head to read data on the magnetic recording medium;
    a servo controller to operate the magnetic recording medium and the head, wherein the servo controller rotates the magnetic recording medium; and
    processor electronics operatively coupled with the servo controller, the processor electronics configured to perform operations comprising:
    receiving a waveform from the head;

generating first information from one or more portions of the waveform corresponding to the helicoid patterns of the first helicoid group;

operating the servo controller on the first information to align the head with respect to a target track of the rotating magnetic recording medium;

generating second information from one or more portions of the waveform corresponding to the helicoid patterns of the second helicoid group;

analyzing the second information with respect to the first information to generate calibration information, wherein the calibration information compensates for operational differences between using the helicoid patterns of the first helicoid group and the helicoid patterns of the second helicoid group to align the head;

first switching, from using the first information to track follow on a first target track, to using the second information to track follow on a second target track to write data to the second target track, wherein the first switching comprises using the calibration information; and second switching, from using the second information to track follow on the second target track, to using the first information to track follow on a third target track to write data to the third target track, wherein analyzing the second information with respect to the first information comprises detecting multiple phase differences that are based on the helicoid patterns of the second helicoid group while compensating for phase differences based on the helicoid patterns of the first helicoid group, each detected phase difference being responsive to a difference between a timestamp derived from at least a portion of the waveform that corresponds to a helicoid pattern of the second helicoid group and an expected timestamp.

16. The system of claim 15, wherein the head comprises a read-write head to write data on the magnetic recording medium, wherein the operations further comprise:
writing data to the magnetic recording medium while operating the servo controller on either the first or second information.

17. The system of claim 15, wherein the calibration information compensates for operational differences being of timing and radial position.

18. The system of claim 15, wherein analyzing the second information with respect to the first information comprises:
determining a radial position deviation of the head with respect to a target track by at least using the first information;
using the radial position deviation to determine a radial repetitive run-out estimate for the second helicoid group;
calculating a static phase difference component for each of the detected phase differences;
calculating a representative static phase difference for the second helicoid group using the static phase difference components; and
calculating a static phase correction value responsive to the representative static phase difference.

19. The system of claim 18, wherein first switching comprises:
applying the radial repetitive run-out estimate to at least reduce an operational difference corresponding to alternating radial position; and
applying the static phase correction value to at least reduce an operational difference corresponding to static timing.

20. The system of claim 15, wherein analyzing the second information with respect to the first information comprises:
determining a radial position deviation of the head with respect to a target track by at least using the second information; and
using the radial position deviation to determine a radial repetitive run-out estimate for the second helicoid group,
wherein first switching comprises applying the radial repetitive run-out estimate to at least reduce an operational difference corresponding to alternating radial position.

21. The system of claim 20, wherein analyzing the second information with respect to the first information further comprises:
adjusting a demodulation window to demodulate the helicoid patterns of the second helicoid group and to produce an adjustment value; and
using the adjustment value to define the radial position deviation.

22. The system of claim 15, wherein analyzing the second information with respect to the first information comprises:
determining an expected peak time value of the helicoid patterns of the first helicoid group;
measuring multiple peak times of the helicoid patterns of the second helicoid group;
calculating a representative peak time value based on the multiple measured peak times; and
calculating a peak time correction value responsive to a difference between the expected peak time value and the representative peak time value,
wherein first switching comprises applying the peak time correction value to at least reduce an operational difference corresponding to radial position.

23. The system of claim 15, wherein analyzing the second information with respect to the first information further comprises:
calculating an alternating phase difference component for each of the detected phase differences; and
initializing a phase repetitive run-out compensation using the alternating phase difference components,
wherein first switching comprises applying the alternating phase difference components and using an output of the phase repetitive run-out compensation to at least reduce an operational difference corresponding to timing.

24. The system of claim 23, wherein the operations further comprise:
storing the alternating phase difference components as initial values in a feed-forward table, wherein the initial values are updated by the phase repetitive run-out compensation.

25. The system of claim 15, wherein analyzing the second information with respect to the first information further comprises:
calculating a static phase difference component for each of the detected phase differences;
calculating a representative static phase difference for the second helicoid group using the static phase difference components; and
calculating a static phase correction value responsive to the representative static phase difference,
wherein first switching comprises applying the static phase correction value to at least reduce an operational difference corresponding to static timing.

26. The system of claim 15, wherein the second target track is longer than the first target track, and the third target track is longer than the second target track.

27. A disk drive system comprising:
a magnetic recording medium, the magnetic recording medium comprising multiple helicoid patterns arranged in a first helicoid group and a second helicoid group, wherein the helicoid patterns of the first and second helicoid groups define multiple synchronization frames;
a head to read data on the magnetic recording medium;
a servo controller to operate the magnetic recording medium and the head, wherein the servo controller rotates the magnetic recording medium; and
processor electronics operatively coupled with the servo controller, the processor electronics configured to perform operations comprising:
receiving a waveform from the head;
generating first information from one or more portions of the waveform corresponding to the helicoid patterns of the first helicoid group;
operating the servo controller on the first information to align the head with respect to a target track of the rotating magnetic recording medium;
generating second information from one or more portions of the waveform corresponding to the helicoid patterns of the second helicoid group;
analyzing the second information with respect to the first information to generate calibration information, wherein the calibration information compensates for operational differences between using the helicoid patterns of the first helicoid group and the helicoid patterns of the second helicoid group to align the head;
first switching, from using the first information to track follow on a first target track, to using the second information to track follow on a second target track to write data to the second target track, wherein the first switching comprises using the calibration information;
second switching, from using the second information to track follow on the second target track, to using the first information to track follow on a third target track to write data to the third target track;
detecting a number of synchronization frames in the waveform that correspond to the helicoid patterns of the second helicoid group using a demodulation window while operating the servo controller on the first information; and
adaptively centering the demodulation window to demodulate the helicoid patterns of the second helicoid group by at least using the detected number of synchronization frames.

28. The system of claim 27, wherein generating second information comprises:
using the adaptively centered demodulation window to generate at least a portion of the second information.

* * * * *